United States Patent
Nagae

(10) Patent No.: US 7,801,669 B2
(45) Date of Patent: Sep. 21, 2010

(54) EXHAUST GAS CONTROL SYSTEM FOR INTERNAL COMBUSTION ENGINE

(75) Inventor: Masahiro Nagae, Susono (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 50 days.

(21) Appl. No.: 12/293,979

(22) PCT Filed: Mar. 23, 2007

(86) PCT No.: PCT/IB2007/000718

§ 371 (c)(1),
(2), (4) Date: Sep. 22, 2008

(87) PCT Pub. No.: WO2007/107865

PCT Pub. Date: Sep. 27, 2007

(65) Prior Publication Data

US 2009/0063023 A1    Mar. 5, 2009

(30) Foreign Application Priority Data

Mar. 23, 2006   (JP)  .............................. 2006-081081

(51) Int. Cl.
*F02B 47/08* (2006.01)
*F02M 25/07* (2006.01)

(52) U.S. Cl. ............... 701/108; 123/568.2; 123/568.21; 123/559.1

(58) Field of Classification Search .............. 123/559.1, 123/568.11, 568.17, 568.18, 568.21, 568.12, 123/568.2, 698; 60/605.2; 701/108

See application file for complete search history.

(56) References Cited

U.S. PATENT DOCUMENTS

| | | | | |
|---|---|---|---|---|
| 6,899,090 | B2 * | 5/2005 | Arnold | 123/568.12 |
| 7,367,188 | B2 * | 5/2008 | Barbe et al. | 60/605.2 |
| 7,380,400 | B2 * | 6/2008 | Barbe et al. | 60/605.2 |
| 7,493,762 | B2 * | 2/2009 | Barbe et al. | 60/605.2 |
| 2004/0050375 | A1 | 3/2004 | Arnold | |
| 2004/0149272 | A1 | 8/2004 | Kurtz et al. | |
| 2005/0103014 | A1 | 5/2005 | Sasaki | |
| 2007/0246028 | A1 * | 10/2007 | Fujita et al. | 123/568.12 |
| 2008/0295514 | A1 * | 12/2008 | Ono | 60/602 |
| 2008/0314036 | A1 * | 12/2008 | Yokoyama et al. | 60/303 |
| 2009/0038308 | A1 * | 2/2009 | Nagae | 60/602 |
| 2009/0133385 | A1 * | 5/2009 | Ono | 60/277 |
| 2009/0165758 | A1 * | 7/2009 | Nishiumi et al. | 123/568.21 |
| 2009/0194079 | A1 * | 8/2009 | Nagae et al. | 123/568.11 |
| 2009/0223221 | A1 * | 9/2009 | Onishi et al. | 60/603 |
| 2009/0283077 | A1 * | 11/2009 | Murata et al. | 123/568.16 |

FOREIGN PATENT DOCUMENTS

| | | |
|---|---|---|
| EP | 1 420 159 A2 | 5/2004 |
| JP | 2002-021625 A | 1/2002 |
| JP | 2004-150319 A | 5/2004 |
| JP | 2004-156572 A | 6/2004 |
| JP | 2005-076456 A | 3/2005 |

* cited by examiner

*Primary Examiner*—Hai H Huynh
(74) *Attorney, Agent, or Firm*—Sughrue Mion, PLLC

(57) ABSTRACT

The ratio between the amount of exhaust gas recirculated by a high-pressure EGR device and the amount of exhaust gas recirculated by a low-pressure EGR device (mixture ratio) is controlled based on the operating state of an internal combustion engine and the correlation between the fuel consumption rate of the internal combustion engine and the mixture ratio. Thus, high-pressure EGR and low-pressure EGR are performed at the mixture ratio (optimum mixture ratio) at which the fuel consumption rate is at or around the minimum value.

20 Claims, 16 Drawing Sheets

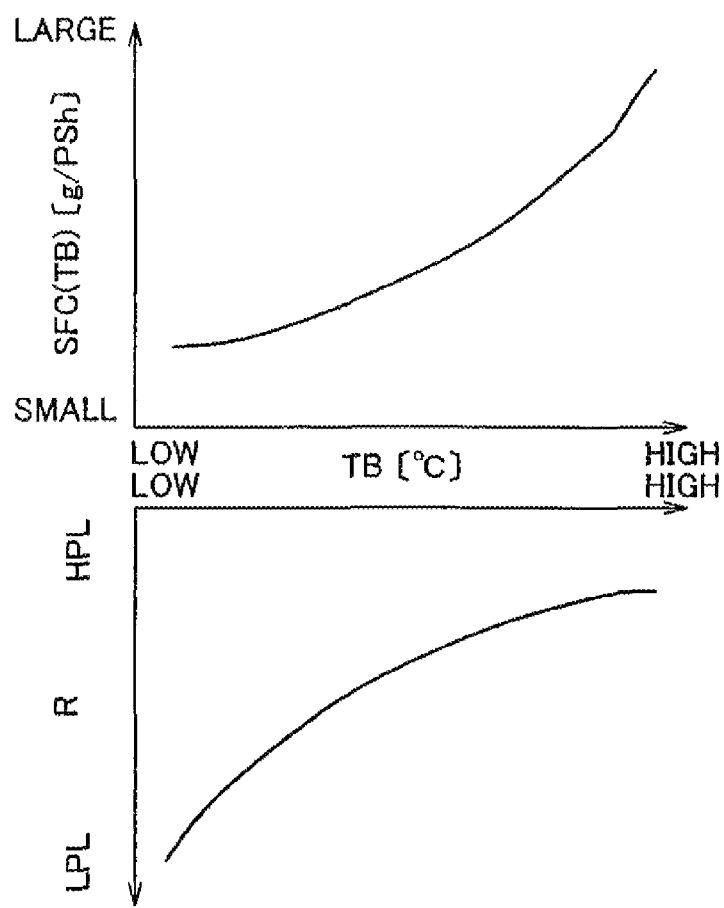
F I G. 4A
F I G. 4B
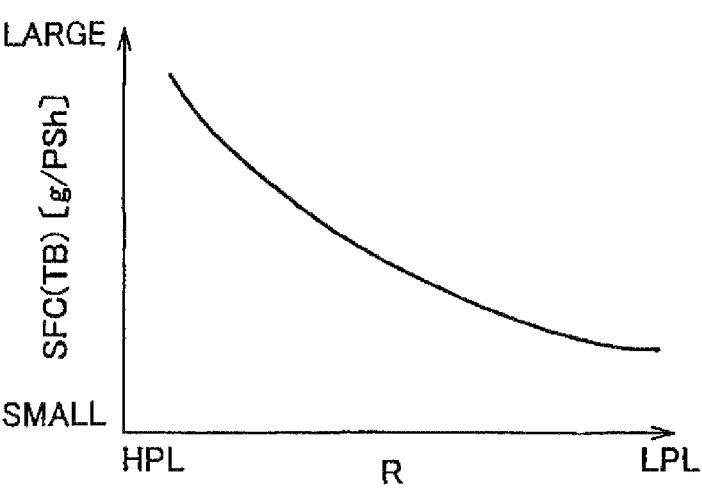
F I G. 4C

EXHAUST GAS CONTROL SYSTEM FOR INTERNAL COMBUSTION ENGINE

BACKGROUND OF THE INVENTION

1. Field of the Invention

The invention relates to an exhaust gas control system for an internal combustion engine.

2. Description of the Related Art

In order to reduce the amount of nitrogen oxides (hereinafter, referred to as "NOx") contained in the exhaust gas discharged from an internal combustion engine, an exhaust gas recirculation system that returns part of the exhaust gas to an intake system is frequently used (hereinafter, returning part of the exhaust gas to an intake system of an internal combustion engine will be referred to as "EGR").

In order to make it possible to perform EGR in a broader operating range of an internal combustion engine, the following technology is frequently employed. According to the technology, a high-pressure EGR device that returns the exhaust gas upstream of a turbine of a turbocharger to a portion of an intake passage, which is downstream of a compressor, and a low-pressure EGR device that returns the exhaust gas downstream of the turbine to a portion of the intake passage, which is upstream of the compressor are both provided. Depending on the operating state of an internal combustion engine, the EGR device used is switched between the high-pressure EGR device and the low-pressure EGR device or the high-pressure EGR device and the low-pressure FOR device are used in combination.

Japanese Patent Application Publication No. 2005-76456 (JP-A-2005-76456) describes an EGR system that incorporates the technology described above. According to this publication, when the load placed on an internal combustion engine is low, EGR is performed by a high-pressure EGR device. When the load placed on the internal combustion is high, EGR is performed by the low-pressure EGR. At or around the boundary between the operating range where the engine load is high and the operating range where the engine load is low, the low-pressure EGR device and the high-pressure EGR device are used in combination.

In order to increase the efficiency of reduction in the amount of NOx discharged (hereinafter, referred to as the "NOx discharge amount"), the amount of exhaust gas returned to an intake system of an internal combustion engine by the EGR device (hereinafter, referred to as the "EGR gas amount") needs to be increased. Namely, in order to increase the efficiency of reduction in the NOx discharge amount, EGR needs to be performed at a high EGR rate.

However, if the EGR rate increases, an increase in the rate, at which the internal combustion engine consumes the fuel (hereinafter, referred to as the "fuel consumption rate of the internal combustion engine"), due to performance of EGR is no longer ignored.

For example, when the amount of exhaust gas recirculated by the high-pressure EGR device (hereinafter, referred to as the "high-pressure EGR gas amount") increases, the temperature of the gas flowing into a combustion chamber of the internal combustion engine (hereinafter, referred to as the "inflow gas temperature") increases, which may increase the fuel consumption rate. Also, the fuel consumption rate may be increased by various factors such as a decrease in the air-fuel ratio, an increase in the combustion temperature, and an increase in the amount of smoke (unburned fuel).

If the high-pressure EGR gas amount increases, the amount of exhaust gas that drives a turbine of a turbocharger decreases, which decreases the boost pressure. In contrast, in an internal combustion engine that is provided with a variable nozzle turbocharger, a decrease in the boost pressure is suppressed by reducing the opening amount of a variable nozzle. However, if the opening amount of the variable nozzle is reduced, the difference in pressure between the exhaust gas upstream of a turbine and the exhaust gas downstream of the turbine increases. As a result, the fuel consumption rate may increase due to the pumping loss that is caused by such increase in the pressure difference.

Meanwhile, when the amount of exhaust gas recirculated by the low-pressure EGR device (hereinafter, referred to as the "low-pressure EGR gas amount") increases, the opening amount of an exhaust throttle valve or an intake throttle valve may be reduced to increase the pressure difference between the exhaust gas downstream of the turbine and the intake gas upstream of the compressor. In this case, the pressure difference between the gas upstream of each of the exhaust throttle valve and the intake throttle valve and the gas downstream thereof (hereinafter, referred to as the "upstream-downstream pressure difference") increases. As a result, the fuel consumption rate may increase due to the pumping loss caused by such increase in the pressure difference.

An EGR gas passage of the low-pressure EGR device tends to be longer than an EGR gas passage of the high-pressure EGR device. Accordingly, if the low-pressure EGR gas amount increases, the fuel consumption rate may increase due to the passage resistance of the EGR gas passage.

As described above, there are various factors that contribute to increases in the fuel consumption rate of the internal combustion engine (the pumping loss, the inflow gas temperature, the opening amount of the variable nozzle, etc. Hereafter, these factors will be collectively referred to as the "fuel consumption rate increase factors"). The fuel consumption rate increase factors have different correlations with changes in the high-pressure EGR gas amount and the low-pressure EGR gas amount. Accordingly, when EGR is performed at a high EGR rate, it is important to control the ratio at which the high-pressure EGR gas and the low-pressure EGR gas are mixed together (hereinafter, referred to as the "mixture ratio between the high-pressure EGR gas and the low-pressure EGR gas") based on the correlation between the mixture ratio and the fuel consumption rate in order to suppress an increase in the fuel consumption rate.

SUMMARY OF THE INVENTION

It is an object of the invention to enable an exhaust gas control system for an internal combustion engine, which performs EGR while switching the EGR device used between a high-pressure EGR device and a low-pressure EGR device or using the high-pressure EGR device and the low-pressure EGR device in combination, to perform EGR at a high EGR rate while suppressing an increase in the fuel consumption rate of the internal combustion engine as much as possible.

A first aspect of the invention relates to an exhaust gas control system for an internal combustion engine, which includes a turbocharger that has a compressor provided to an intake passage of an internal combustion engine and a turbine provided to an exhaust passage of the internal combustion engine; a high-pressure ER device which has a high-pressure ER passage that connects a portion of the exhaust passage, which is upstream of the turbine to a portion of the intake passage, which is downstream of the compressor, and which returns part of exhaust gas to the internal combustion engine through the high-pressure EGR passage; and a low-pressure EGR device which has a low-pressure EGR passage that connects a portion of the exhaust passage, which is downstream of the turbine to a portion of the intake passage, which is upstream of the compressor, and which returns part of the exhaust gas through the low-pressure EGR passage. The exhaust gas control system performs exhaust gas recirculation while switching the ER device used between the high-pressure EGR device and the low-pressure EGR device or using the high-pressure EGR device and the low-pressure EGR device in combination. According to the aspect of the invention described above, the mixture ratio between the exhaust gas recirculated by the high-pressure ER device and the exhaust gas recirculated by the low-pressure EGR device is controlled based on the correlation between the mixture ratio and the fuel consumption rate of the internal combustion engine.

In the exhaust gas control system according to the aspect of the invention described above, the mixture ratio between the high-pressure EGR gas and the low-pressure EGR gas is set based on the fuel consumption rate of the internal combustion engine. In the exhaust gas control system according to the aspect of the invention described above, EGR may be performed using only one of the high-pressure EGR device and the low-pressure FOR device. In such a case, the high-pressure EGR gas and the low-pressure EGR gas are not mixed. When only the high-pressure EGR device is used, the mixture ratio is defined as the mixture ratio at which the proportion of the high-pressure ER as to the total EGR gas amount is 100%. When only the low-pressure EGR device is used, the mixture ratio is defined as the mixture ratio at which the proportion of the low-pressure ER gas to the total EGR gas amount is 100%.

In the aspect of the invention described above, the mixture ratio may be controlled to the mixture ratio at which the fuel consumption rate is the optimum value in the correlation between the mixture ratio and the fuel consumption rate, Namely, the high-pressure EGR gas and the low-pressure EGR gas may be mixed at the mixture ratio at which the fuel consumption rate is the optimum value, based on the manner in which the fuel consumption rate changes with respect to a change in the mixture ratio. Accordingly, it is possible to perform EGR at the required EGR rate while suppressing an increase in the fuel consumption rate of the internal combustion engine. Hereinafter, the mixture ratio at which the fuel consumption rate is the optimum value will be referred to as the "optimum mixture ratio".

The description that the fuel consumption rate is the optimum value means that the fuel consumption rate is minimized under a predetermined condition. The description that the fuel consumption rate is the optimum value does not always mean that the fuel consumption rate is the minimum value or a considerably small value.

For example, when the predetermined condition is the condition that the amount of NOx produced during combustion in the internal combustion engine is reduced, the optimum mixture ratio may be set to the mixture ratio at which the fuel consumption rate is reduced as much as possible to the extent that the reduction rate of the NOx production amount is not sacrificed.

The high-pressure EGR device and the low-pressure EGR device are controlled so that the high-pressure EGR gas and the low-pressure EGR gas are mixed at the mixture ratio set in the above-described manner. Thus, it is possible to perform EGR at the EGR rate required to achieve the reduction rate of the NOx production amount while suppressing an increase in the fuel consumption rate as much as possible.

In the aspect of the invention described above, when the predetermined condition is the condition that the fuel consumption rate of the internal combustion engine is reduced, the optimum mixture ratio may be set to the mixture ratio at which the fuel consumption rate is the minimum value or the considerably small value in the correlation between the mixture ratio and the fuel consumption rate.

The high-pressure EGR device and the low-pressure FOR device are controlled so that the high-pressure EGR gas and the low-pressure EGR gas are mixer at the mixture ratio set in the above-described manner. Thus, it is possible to perform EGR while suppressing an increase in the fuel consumption rate of the internal combustion engine.

Also, various corrections may be made, based on the subordinate conditions, to the mixture ratio that is set to optimize the fuel consumption rate. In this case, the high-pressure EGR gas and the low-pressure EGR gas are mixed at a mixture ratio that deviates from the optimum mixture ratio. However, the deviation from the optimum mixture ratio is limited to a value in a small deviation range. Thus, it is still possible to suppress the fuel consumption ratio to a small value. In addition, some benefits are offered by satisfying the subordinate conditions.

For example, the low-pressure EGR passage is long, and a time lag between when the control for changing the low-pressure EGR gas amount is executed and when the low-pressure EGR gas amount actually changes cannot be ignored in some cases. In such cases, if the proportion of the low-pressure EGR gas amount to the total EGR gas amount exceeds a certain value, the response to the control of the oxygen concentration in the intake air deteriorates. As a result, the oxygen concentration in the intake air may not be sufficient, for example, when the vehicle is suddenly accelerated. Accordingly, an upper limit of the proportion of the low-pressure EGR gas amount to the total EGR gas amount may be set. Thus, the proportion of the low-pressure EGR gas amount to the total EGR gas amount does not exceed the proportion at which the response to the control of the oxygen concentration in the intake air may deteriorate. Therefore, it is possible to maintain good response to the control of the oxygen concentration in the intake air while suppress the fuel consumption rate to a small value.

The correlation between the mixture ratio and the fuel consumption rate may vary depending on the operating state of the internal combustion engine. For example, the correlation between the mixture ratio and the fuel consumption rate may be expressed by function forms different between when the load placed on the internal combustion engine is high and when the load placed on the internal combustion engine is low. In this case, the mixture ratio at which the fuel consumption rate is the optimum value may vary, because the correlation between the mixture ratio and the fuel consumption rate varies depending on the load placed on the internal combustion engine.

In the aspect of the invention described above, the mixture ratio may be controlled based on the operating state of the internal combustion engine in addition to the correlation between the mixture ratio and the fuel consumption rate. Thus, it is possible to control the mixture ratio to the optimum mixture ratio with high degree of accuracy by taking the operating state of the internal combustion engine into account.

The fuel consumption rate of the internal combustion engine changes depending on the various fuel consumption rate increase factors described above. Namely, the fuel consumption rate of the internal combustion engine is influenced by one or more components that change(s) depending on the various fuel consumption rate increase factors (hereinafter, referred to as the "fuel consumption rate component").

In the aspect of the invention described above, the correlation between the mixture ratio and the fuel consumption rate may be defined based on multiple correlations between the mixture ratio and respective fuel consumption rate components that exert influences on the fuel consumption rate.

In the aspect of the invention described above, the correlation between the mixture ratio and the fuel consumption rate may be defined based on the operating state of the internal combustion engine in addition to the correlation between the mixture ratio and the fuel consumption rate component. Thus, it is possible to approximate the correlation between the mixture ratio and the fuel consumption rate of the internal combustion engine to the actual complicated correlation between the mixture ratio and the fuel consumption rate by combining the multiple correlations between the mixture ratio and the respective fuel consumption rate components that have relatively simple correlations with the mixture ratio.

With this structure, it is possible to approximate the actual correlation between the fuel consumption rate and the mixture ratio based on the fuel consumption rate components that exert influences on the fuel consumption rate.

In the aspect of the invention described above, because the optimum mixture ratio is obtained based on the correlation between the fuel consumption rate and the mixture ratio, it is important to approximate the actual form of the function that expresses the correlation between the mixture ratio and the fuel consumption rate. For example, if the correlation between the fuel consumption rate and the mixture ratio is expressed by a smooth function form, it is possible to obtain the optimum mixture ratio based on the partial differential coefficient of the function concerning the mixture ratio.

The correlation between the fuel consumption rate component and the mixture ratio may vary depending on the operating state of the internal combustion engine. Examples of such fuel consumption rate component include the fuel consumption rate component that exerts an influence on the fuel consumption rate so that the fuel consumption rate increases as the load placed on the internal combustion engine increases, the fuel consumption rate component that exerts an influence on the fuel consumption rate so that the fuel consumption rate increases as the load placed on the internal combustion engine decreases, and the fuel consumption rate component that exerts an influence on the fuel consumption rate based on the complicated dependency on the operating state of the internal combustion engine.

When the actual correlation between the fuel consumption rate and the mixture ratio is approximated by combining the multiple correlations between the mixture ratio and the respective fuel consumption rate components, the above-described dependencies of the fuel consumption rate components on the operating state of the internal combustion engine are also taken into account. Thus, it is possible to approximate the actual correlation between the fuel consumption rate and the mixture ratio with higher degree of accuracy.

As a result it is possible to more accurately control the mixture ratio to the optimum mixture ratio, which makes it possible to reliably achieve both high EGR rate and low fuel consumption rate.

The correlation between the mixture ratio and the fuel consumption rate of the internal combustion engine may be defined based on the multiple correlations between the mixture ratio and the respective fuel consumption rate components that may exert influences on the fuel consumption rate due to performance of EGR and that have different dependencies on the mixture ratio.

In the aspect described above the correlation between the fuel consumption rate and the mixture ratio may be defined based on at least one of the correlation between the mixture ratio and the fuel consumption rate component that exerts an influence on the fuel consumption rate so that the fuel consumption rate increases as the amount of exhaust gas recirculated by the low-pressure EGR device increases (hereinafter, referred to as the "low-pressure EGR positive correlation fuel consumption rate component"), and the correlation between the mixture ratio and the fuel consumption rate component that exerts an influence on the fuel consumption rate so that the fuel consumption rate increases as the amount of exhaust gas recirculated by the high-pressure EGR device increases (hereinafter; referred to as the "high-pressure EGR positive correlation fuel consumption rate component").

According to the aspect described above, the two components that have different tendencies are combined with each other, that is, the component that exerts an influence on the fuel consumption rate so that the filet consumption rate tends to increase as the proportion of the low-pressure EGR gas amount to the total EGR gas amount increases is combined with the component that exerts an influence on the fuel consumption rate so that the fuel consumption rate tends to increase as the proportion of the high-pressure EGR gas amount to the total EGR gas amount increases. Thus, it is possible to express the correlation between the fuel consumption rate that depends on various fuel consumption rate increase factors and the mixture ratio by a simple function form.

Accordingly, controlling the mixture ratio based on the correlation between the fuel consumption rate and the mixture ratio defined in the above-described manner makes it possible to set the optimum mixture ratio at which an increase in the fuel consumption rate is more reliably suppressed.

In the aspect described above, the correlation between the mixture ratio and the fuel consumption rate may be defined based further on the operating state of the internal combustion engine. The actual correlation between the fuel consumption rate and the mixture ratio is approximated based on the dependencies of the fuel consumption rate components on the operating state of the internal combustion engine in addition to the correlation(s) between the mixture ratio and the low-pressure EGR positive correlation fuel consumption rate component or/and the high-pressure EGR positive correlation fuel consumption rate component. Thus, it is possible to obtain the mixture ratio at which an increase in the fuel consumption rate is more reliably suppressed.

In the aspect described above, the correlation between the mixture ratio and the low-pressure EGR positive correlation fuel consumption rate component ma be defined based on at least one of the correlation between the mixture ratio and the fuel consumption rate component that exerts an influence on the fuel consumption rate so that the fuel consumption rate increases as the load placed on the internal combustion engine increases (hereinafter, referred to as the "low-pressure EGR high-load positive correlation fuel consumption rate component"), and the correlation between the mixture ratio and the fuel consumption rate component that exerts an influence on the fuel consumption rate so that the fuel consumption rate increases as the load placed on the internal combustion engine decreases (hereinafter, referred to as the "low-pressure EGR low-load positive correlation fuel consumption rate component").

In the aspect described above, the correlation between the mixture ratio and the high-pressure EGR positive correlation fuel consumption rate component may be defined based on at least one of the correlation between the mixture ratio and the fuel consumption rate component that exerts an influence on the fuel consumption rate so that the fuel consumption rate increases as the load placed on the internal combustion engine increases (hereinafter, referred to as the "high-pressure EGR high-load positive correlation fuel consumption rate component"), and the correlation between the mixture ratio and the fuel consumption rate component that exerts an influence on the fuel consumption rate so that the fuel consumption rate increases as the load placed on the internal combustion engine decreases (hereinafter; referred to as the "high-pressure EGR low-load positive correlation fuel consumption rate component").

Examples of the fuel consumption rate increase factors that may exert relatively great influences on the fuel consumption rate due to performance of EGR include the inflow gas temperature, the upstream-downstream pressure difference of an exhaust throttle valve and an intake throttle valve, the upstream-downstream pressure difference of a variable nozzle turbine, and the passage resistance of the high-pressure EGR passage and the low-pressure EGR passage.

The fuel consumption rate component that changes depending on the inflow gas temperature (hereinafter, referred to as the "inflow gas temperature fuel consumption rate component") exerts an influence on the fuel consumption rate as an increasing function of the inflow gas temperature. The inflow gas temperature increases as the high-pressure EGR gas amount increases. Accordingly, the inflow gas temperature fuel consumption rate component is the high-pressure ER positive correlation fuel consumption rate component that tends to increase as the mixture ratio changes so that the proportion of the high-pressure EGR gas amount to the total EGR gas amount increases.

When the load placed on the internal combustion engine is low, even if the inflow gas temperature is high, the amount of smoke produced is less likely to increase. On the other hand, when the load placed on the internal combustion engine is high, if the inflow gas temperature is high, the amount of smoke produced is likely to increase.

Namely, when the load placed on the internal combustion engine is low, even if the high-pressure EGR gas amount increases, the inflow gas temperature fuel consumption rate component is less likely to increase. However, when the load placed on the internal combustion engine is high, if the high-pressure EGR gas amount increases, the inflow gas temperature fuel consumption rate component is likely to increase. Accordingly, the inflow gas temperature fuel consumption rate component is the high-pressure EGR high-load positive correlation fuel consumption rate component.

The fuel consumption rate component that changes depending on the pumping loss caused by the upstream-downstream pressure difference of a turbine of a variable nozzle turbocharger (hereinafter, referred to as the "variable nozzle fuel consumption rate component") exerts an influence on the fuel consumption rate as an increasing function of the turbine upstream-downstream pressure difference. Because the opening amount of the variable nozzle of the turbine is reduced in order to compensate for a decrease in the boost pressure due to an increase in the high-pressure EGR gas amount, the turbine upstream-downstream pressure difference increases as the high-pressure EGR gas amount increases. Accordingly, the variable nozzle fuel consumption rate component is the high-pressure EGR positive correlation fuel consumption rate component that tends to increase as the mixture ratio changes so that the proportion of the high-pressure EGR gas amount to the total EGR gas amount increases.

When the load placed on the internal combustion engine is low, if the boost pressure decreases, the stability of the output from the internal combustion engine deteriorates. Accordingly, it is necessary to maintain the boost pressure by reducing the opening amount of the variable nozzle. On the other hand, when the load placed on the internal combustion engine is high, even if the boost pressure decreases to some degree, the stability of the output from the internal combustion engine is less likely to deteriorate. The opening amount of the variable nozzle is reduced by a less amount.

Namely, the variable nozzle fuel consumption rate component is likely to increase if the high-pressure EGR gas amount increases when the load placed on the internal combustion engine is low. However, the variable nozzle fuel consumption rate component is less likely to increase even if the high-pressure EGR gas amount increases when the load placed on the internal combustion engine is high. Accordingly, the variable nozzle fuel consumption rate component is the high-pressure EGR low-load positive correlation fuel consumption rate component.

The fuel consumption rate component that changes depending on the pumping loss caused due to the upstream-downstream pressure difference of the exhaust throttle valve or the intake throttle valve (hereinafter, referred to as the "throttle valve fuel consumption rate component") (hereinafter, the exhaust throttle valve and the intake throttle valve will be sometimes collectively referred to as the "throttle valve") exerts an influence on the fuel consumption rate as an increasing function of the throttle valve upstream-downstream pressure difference. Because the opening amount of the throttle valve is reduced when the low-pressure EGR gas amount is increased, the throttle valve upstream-downstream pressure difference increases as the low-pressure EGR gas amount increases. Accordingly, the throttle valve fuel consumption rate component is the low-pressure EGR positive correlation fuel consumption rate component that tends to increase as the mixture ratio changes so that the proportion of the low-pressure EGR gas amount to the total EGR gas amount increases.

When the load placed on the internal combustion engine is low, the pressure of the exhaust gas is low and the pressure difference between the upstream side and the downstream side in the low-pressure EGR passage is unlikely to occur. Therefore, the opening amount of the throttle valve sometimes needs to be reduced in order to obtain sufficient low-pressure EGR gas amount. On the other hand, when the load placed on the internal combustion engine is high, the pressure of the exhaust gas is high. Accordingly, the low-pressure EGR gas amount is increased without reducing the opening amount of the throttle valve.

Namely, the throttle valve fuel consumption rate component is likely to increase if the low-pressure EGR gas amount is increased when the load placed on the internal combustion engine is low. However, when the load placed on the internal combustion engine is high, even if the low-pressure EGR gas amount is increased, the throttle valve fuel consumption rate component is less likely to increase. Accordingly, the throttle valve filet consumption rate component is the low-pressure EGR low-load positive correlation fuel consumption rate component.

The fuel consumption rate component that changes depending on the passage resistance of the high-pressure EGR passage or the low-pressure EGR passage (hereinafter, referred to as the "passage resistance fuel consumption rate component") exerts an influence on the fuel consumption rate as an increasing function of the passage length. The low-pressure EGR passage that connects the portion of the exhaust passage, which is downstream of the turbine to the portion of the intake passage, which is upstream of the compressor is likely to be longer than the high-pressure FOR passage that connects the portion near an exhaust manifold to the portion near an intake manifold. Accordingly, the passage resistance fuel consumption rate component is the low-pressure EGR positive correlation fuel consumption rate component that tends to increase as the mixture ratio changes so that the proportion of the low-pressure EGR gas amount to the total EGR gas amount increases.

As the load placed on the internal combustion engine increases, the flow rate of the exhaust gas increases and the flow rate of the exhaust gas flowing through the low-pressure EGR passage increases. Because the pumping loss caused due to the passage resistance increases as the flow rate of the exhaust gas flowing through the passage increases. Accordingly, the passage resistance fuel consumption rate component is the low-pressure EGR high-load positive correlation fuel consumption rate component.

In the aspect of the invention described above, the optimum mixture ratio may be defined based on the actual correlation between the fuel consumption rate and the mixture ratio that is approximated by combining the multiple correlations between the mixture ratio and the respective fuel consumption rate components.

In the exhaust gas control system according to the aspect of the invention described above, an exhaust throttle valve may be provided to a portion of the exhaust passage, which is downstream of the position at which the exhaust passage and the low-pressure ER passage are connected to each other, and/or an intake throttle valve may be provided to a portion of the intake passage, which is upstream of the position at which the intake passage and the low-pressure EGR passage are connected to each other (hereinafter, the exhaust throttle valve and the intake throttle valve will be collectively referred to as the "throttle valve"). In such a case, the correlation between the mixture ratio and the fuel consumption rate may be defined based on the correlation between the throttle valve fuel consumption rate component and the mixture ratio and the correlation between the inflow gas temperature fuel consumption rate component and the mixture ratio.

In the exhaust gas control apparatus according to the aspect of the invention described above, an exhaust throttle valve may be provided to a portion of the exhaust passage, which is downstream of the position at which the exhaust passage and the low-pressure EGR passage are connected to each other, and/or an intake throttle valve may be provided to a portion of the intake passage, which is upstream of the position at which the intake passage and the low-pressure FUR passage are connected to each other (hereinafter, the exhaust throttle valve and the intake throttle valve will be collectively referred to as the "throttle valve"). In additions the turbocharger may include a variable capacity turbocharger that has a variable nozzle turbine. In such a case, the correlation between the mixture ratio and the fuel consumption rate may be defined based on the correlation between the throttle valve fuel consumption rate component and the mixture ratio and the correlation between the variable nozzle fuel consumption rate component and the mixture ratio.

In each of the cases described above, the optimum mixture ratio corresponding to the operating state of the internal combustion engine may be derived by taking it into account that the throttle valve fuel consumption rate component is the low-pressure EGR low-load positive correlation fuel consumption rate component, the inflow gas temperature fuel consumption rate component is the high-pressure EGR high-load positive correlation fuel consumption rate component, and the variable nozzle fuel consumption rate component is the high-pressure EGR low-load positive correlation fuel consumption rate component. Thus, it is possible to derive the optimum mixture ratio at which an increase in the fuel consumption rate is more reliably suppressed.

A second aspect of the invention relates to an exhaust gas control method for an internal combustion engine provided with a turbocharger that has a compressor provided to an intake passage of an internal combustion engine and a turbine provided to an exhaust passage of the internal combustion engine; a high-pressure EGR device which has a high-pressure EGR passage that connects a portion of the exhaust passage, which is upstream of the turbine to a portion of the intake passage, which is downstream of the compressor, and which returns part of exhaust gas to the internal combustion engine through the high-pressure EGR passage; and a low-pressure EGR device which has a low-pressure EGR passage that connects a portion of the exhaust passage, which is downstream of the turbine to a portion of the intake passage, which is upstream of the compressor, and which returns part of the exhaust gas through the low-pressure EGR passage. According to the exhaust gas control method, the mixture ratio between the exhaust gas recirculated by the high-pressure EGR device and the exhaust gas recirculated by the low-pressure EGR device is controlled based on the correlation between the mixture ratio and a fuel consumption rate of the internal combustion engine while the EGR device used is switched between the high-pressure EGR device and the low-pressure EGR device or the high-pressure EGR device and the low-pressure ER device are used in combination.

In the exhaust gas control method according to the second aspect of the invention, the following steps may be executed. The engine speed and the engine load of the internal combustion engine are obtained. The amount of intake air flowing through the intake passage is obtained using an airflow meter. The target EGR rate is set. The target mixture ratio is set. The target opening amount for the low-pressure EGR valve and the target opening amount for a high-pressure EGR valve are calculated based on the amount of intake air, the target FOR rate, and the target mixture ratio. The opening amount of the low-pressure EGR valve is controlled based on the target opening amount for the low-pressure EGR valve. The opening amount of the high-pressure EGR valve is controlled based on the target opening amount for the high-pressure EGR valve. The temperature of gas in an intake manifold of the internal combustion engine is detected. Whether the temperature of the gas is in the target temperature range is detected. If the temperature of the gas is not in the target temperature range, at least one of the opening amount of the low-pressure EGR valve and the opening amount of the high-pressure EGR valve is corrected.

The invention enables the exhaust gas control system for an internal combustion engine, which performs EGR while switching the EGR device used between the high-pressure EGR device and the low-pressure ER device or using the high-pressure EGR device and the low-pressure EGR device in combination, to perform ER at a high EGR rate while suppressing an increase in the fuel consumption rate of the internal combustion engine as much as possible.

BRIEF DESCRIPTION OF THE DRAWINGS

The foregoing and/or further objects, features and advantages of the invention will become more apparent from the following description of example embodiments with reference to the accompanying drawings, in which the same or corresponding portions will be denoted by the same reference numerals and wherein:

FIGS. 4A, 4B and 4C are the graphs showing the correlation among the inflow gas temperature fuel consumption rate component, the inflow gas temperature and the mixture ratio between the high-pressure EGR gas and the low-pressure EGR gas according to the first embodiment of the invention;

DETAILED DESCRIPTION OF THE EXAMPLE EMBODIMENTS

Hereafter, the embodiments of the invention will be described in detail with reference to the accompanying drawings. Note that, the description concerning the sizes, materials, shapes and relative arrangements of the components in the embodiments of the invention do not limit the technical scope of the invention unless otherwise specified.

i First Embodiment

Figure 1:
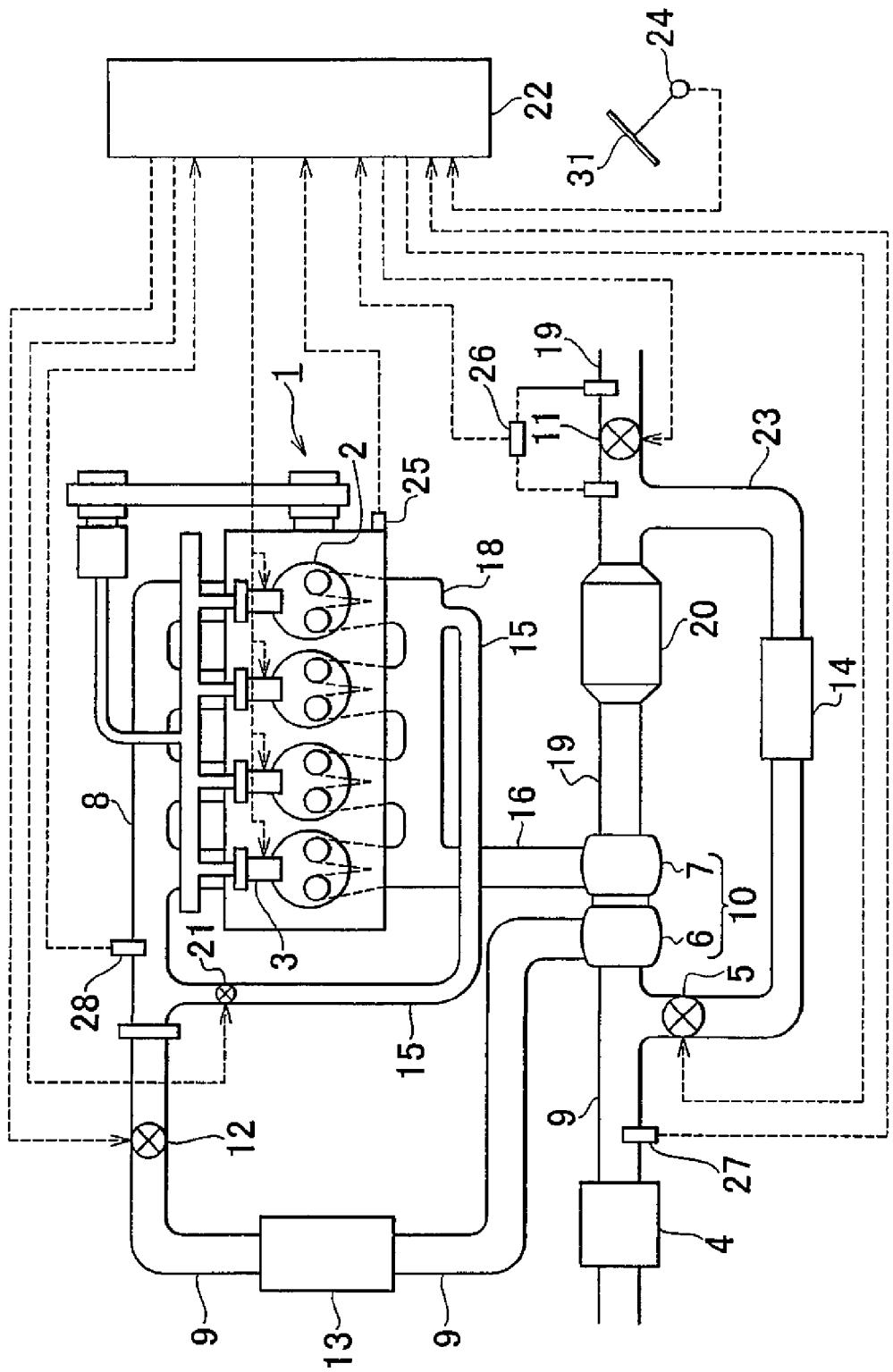
FIG. 1 is the view schematically showing the structure of an internal combustion engine and intake/exhaust systems thereof according to a first embodiment of the invention.

FIG. 1 is the view schematically showing the structure of an internal combustion engine 1 to which a first embodiment of the invention is applied. The internal combustion engine 1 shown in FIG. 1 is a diesel engine that includes four cylinders 2. In the internal combustion engine 1, each cylinder 2 is provided with a fuel injection valve 3 that injects fuel directly into a combustion chamber of the cylinder 2.

An intake manifold 8 is connected to the internal combustion engine 1. The branch pipes of the intake manifold 8 communicate with the combustion chambers of the respective cylinders 2 through respective intake ports. A throttle valve 12 that changes the flow passage area of an intake passage 9 is provided near the position at which the intake manifold 8 and the intake passage 9 are connected to each other. In the intake passage 9, an intercooler 13 that cools the gas flowing through the intake passage 9 is provided upstream of the throttle valve 12. In the intake passage 9, a compressor housing 6 of a turbocharger 10 that operates using the energy of the exhaust gas as a driving source is provided upstream of the intercooler 13. In the intake passage 9, an air cleaner 4 is provided upstream of the compressor housing 6. The throttle valve 12 is connected to an ECU 22, described later in detail via electric wiring. The opening amount of the throttle valve 12 is controlled based on the control signals from the ECU 22, and, therefore, the amount of gas flowing through the intake passage 9 is adjusted. The ECU 22 is regarded as a control portion according to the invention.

An exhaust manifold 18 is connected to the internal combustion engine 1. The branch pipes of the exhaust manifold communicate with the combustion chambers of the respective cylinders 2 through the respective exhaust ports. A turbine housing 7 of the turbocharger 10 is connected to the exhaust manifold 18. An exhaust passage 19 is connected to the turbine housing 7. A particulate filter 20 (hereinafter, simply referred to as a "filter 20") that traps particulate matter (M) in the exhaust gas is provided in the exhaust passage 19. In the exhaust passage 19, an exhaust throttle valve 11 that changes the flow passage area of the exhaust passage 19 is provided downstream of the filter 20. On the downstream side of the exhaust throttle valve 11, the exhaust passage 19 is exposed to the atmosphere. The exhaust throttle valve 11 is connected to the ECU 22 via electric wiring. The opening amount of the exhaust throttle valve 11 is controlled based on the control signals from the ECU 22, and, therefore, the amount of exhaust gas flowing through the exhaust passage 19 is adjusted.

Instead of the filter 20, an exhaust gas control apparatus may be provided in the exhaust passage 19. Examples of such exhaust gas control apparatus include a storage-reduction NOx catalyst and a urea selective reduction NOx catalyst that remove NOx in the exhaust gas, and an oxidation catalyst that oxidizes the unburned fuel, etc. in the exhaust gas.

A low-pressure EGR passage 23 provides communication between the portion of the exhaust passage 19, which is downstream of the filter 20 and upstream of the exhaust throttle valve 11, and the portion of the intake passage 9, which is upstream of the compressor housing 6 and downstream of the air cleaner 4. In the low-pressure EGR passage 23, a low-pressure EGR cooler 14 that cools the exhaust gas flowing through the low-pressure EGR passage 23 and a low-pressure EGR valve 5 that changes the flow passage area of the low-pressure EGR passage 23 are provided. The low-pressure EGR passage 5 is connected to the ECU 22 via electric wiring. The opening amount of the low-pressure EGR valve 5 is controlled based on the control signals from the ECU 22, and, therefore, the amount of exhaust gas flowing through the low-pressure EGR passage 23 (hereinafter, referred to as the "low pressure EGR gas amount") is adjusted.

A high-pressure ER passage 15 provides communication between the exhaust manifold 18 and the intake manifold 8. A high-pressure EGR valve 21 that changes the flow passage area of the high-pressure EGR passage 15 is provided in the high-pressure EGR passage 15. The high-pressure EGR valve 21 is connected to the ECU 22 via electric wiring. The opening amount of the high-pressure EGR valve 21 is controlled based on the control signals from the ECU 22, and, therefore, the amount of exhaust gas flowing through the high-pressure EGR passage 15 (hereinafter, referred to as the "high-pressure EGR gas amount") is adjusted.

An accelerator pedal 31 arranged near the driver's seat is provided with a load sensor 24 that detects the accelerator pedal operation amount as the load placed on the internal combustion engine 1. The crankshaft (not shown) of the internal combustion engine 1 is provided with a crank position sensor 25 that detects the rotational speed of the crankshaft as the rotational speed of the internal combustion engine 1. A pressure difference sensor 26 that detects the upstream-downstream pressure difference of the exhaust throttle valve 11 is provided in the exhaust passage 19. An airflow meter 27 that detects the flow rate of the intake air is provided in the intake passage 9. The intake manifold 8 is provided with an inflow gas temperature sensor 28 that detects the temperature of the gas in the intake manifold (hereinafter, referred to as the "inflow gas temperature"). These sensors are connected to the ECU 22 via electric wiring and the ECU 22 receives signals indicating the detection results from these sensors.

The internal combustion engine 1 is provided with and controlled by the ECU 22 that is an electronic control computer. The ECU 22 includes ROM, RAM, a CPU, an input port, an output port, etc. (not shown). The ECU 22 executes known controls such as fuel injection control based on the operating state of the internal combustion engine 1 and instructions from the driver that are detected by the various sensors described above. The ECU 22 also transmits opening amount command signals to the high-pressure EGR valve 21, the low-pressure EGR valve 5, the throttle valve 12, and the exhaust throttle valve 11.

In the structure described above, the pressure of the air introduced from the air cleaner 4 to the intake passage 9 is increased in the compressor housing 6, and then the air is introduced into the combustion chambers of the internal combustion engine 1 through the intercooler 13 and the intake manifold 8.

Meanwhile, the exhaust gas discharged from the combustion chambers flows through the exhaust manifold 18 and a joint passage 16, and then flows into the turbine housing 7 to drive the turbine. The PM in the exhaust gas is trapped in the filter 20. Then, the exhaust gas flows through the exhaust passage 19, and is finally discharged into the atmosphere.

When the low-pressure EGR valve 5 opens, communication through the low-pressure EGR passage 23 is permitted. Then, part of the exhaust gas passed through the filter 20 flows into the intake passage 9 through the low-pressure EGR passage 23. The pressure of the low-pressure EGR gas that flows in the intake passage 9 is increased in the compressor housing 6, and the low-pressure EGR gas is introduced into the combustion chambers of the internal combustion engine 1 through the intake manifold 8. Hereafter, EGR through the low-pressure EGR passage 23 will be referred to as low-pressure EGR.

The ECU 22 controls the opening amount of the exhaust throttle valve 11 to increase or decrease the pressure of the exhaust gas at the position at which the low-pressure EGR passage 23 branches off from the exhaust passage 19. Thus, the low-pressure EGR gas amount is adjusted. For example, if the ECU 22 executes the control to reduce the opening amount of the exhaust throttle valve 11, the pressure of the exhaust gas at the position at which the low-pressure EGR passage 23 branches off from the exhaust passage 19 increases. As a result, the pressure difference between the upstream side and the downstream side in the low-pressure EGR passage 23 increases, which increases the low-pressure EGR gas amount.

When the high-pressure EGR valve 21 opens, communication through the high-pressure EGR passage 15 is permitted. Then, part of the exhaust gas flowing through the exhaust manifold 18 flows into the intake manifold 8 through the high-pressure EGR passage 15, and then returns to the combustion chambers of the internal combustion engine 1. Hereinafter, EGR through the high-pressure EGR passage 15 will be referred to as high-pressure EGR.

The ECU 22 controls the opening amount of the exhaust throttle valve 12 to increase or decrease the pressure of the gas in the intake manifold 8. Thus, the high-pressure EGR gas amount is adjusted. For example, if the ECU 22 executes the control to reduce the opening amount of the throttle valve 12, the amount of air flowing in the intake manifold 8 is reduced. Accordingly, when the gas in the intake manifold 8 is taken into the cylinders 2 during the intake stroke thereof, the pressure of the gas in the intake manifold 8 decreases. As a result, the pressure difference between the upstream side and the downstream side in the high-pressure FOR passage 15 increases, which increases the high-pressure EGR gas amount.

Part of the exhaust gas is returned to the combustion chambers of the internal combustion engine 1 by performing low-pressure EGR and/or high-pressure EGR. Thus, the temperature at which the air-fuel mixture is burned in the combustion chambers (hereinafter, referred to as the "combustion temperature") decreases, and, therefore, the amount of NOx generated during combustion decreases.

The operating state of an internal combustion engine where low-pressure EGR is performed in an appropriate manner differs from the operating state where high-pressure EGR is performed in an appropriate manner. Accordingly, there is a technology that makes it possible to perform EGR in a broader operating range of the internal combustion engine. According to this technology, EGR is switched between high-pressure ER and low-pressure EGR, or high-pressure EGR and the low-pressure EGR are performed in combination depending on the operating state of the internal combustion engine.

Figure 2:
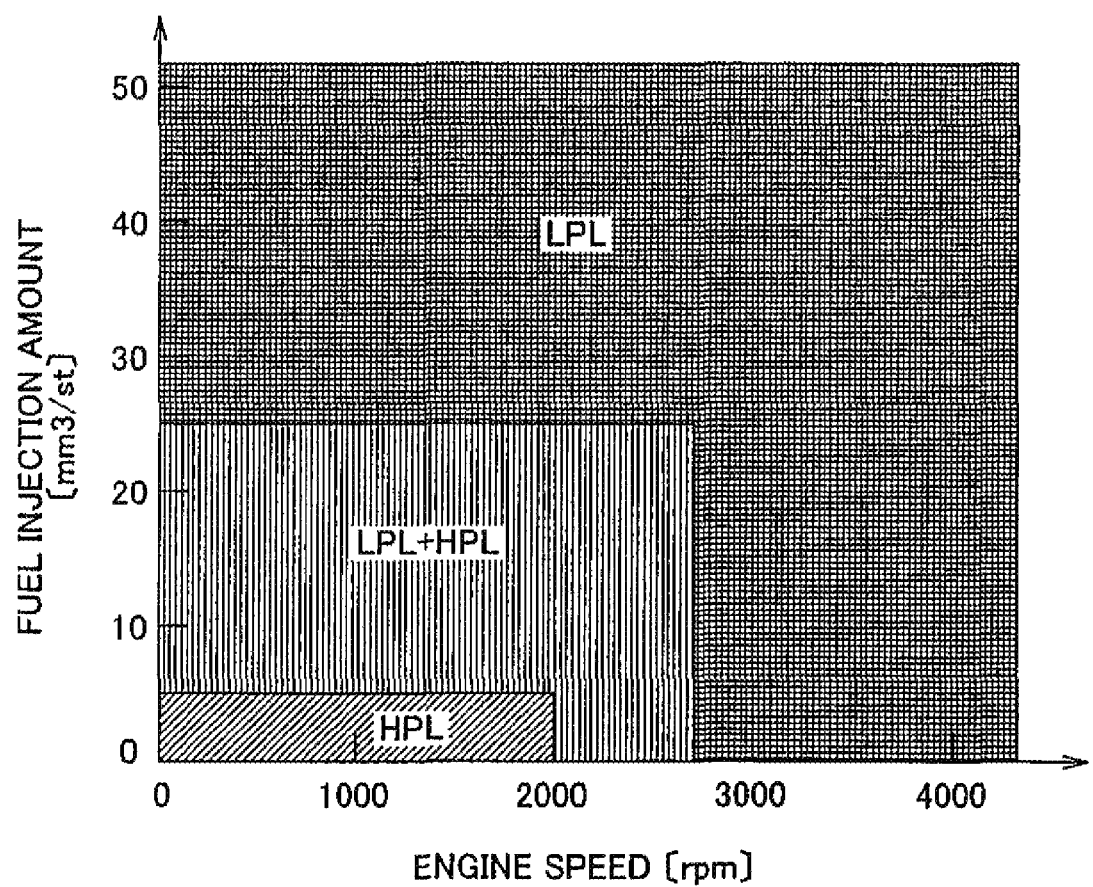
FIG. 2 is the graph showing which of a low-pressure EGR device and a high-pressure EGR device is used to perform EGR in each operating range of the internal combustion engine according to the first embodiment of the invention.

FIG. 2 is the graph showing which of low-pressure EGR and high-pressure EGR is performed in each operating range of the internal combustion engine 1. In FIG. 2, the lateral axis represents the rotational speed of the internal combustion engine 1 (the engine speed), and the vertical axis represents the amount of fuel injected into the internal combustion engine 1. The fuel injection amount is a parameter that indicates the load placed on the internal combustion engine 1.

In the range HPL in FIG. 2, the load placed on the internal combustion engine 1 is low and the internal combustion engine 1 is running at low speed. In the range HPL, high-pressure EGR is mainly performed. In the range HPL+LPL in FIG. 2, the load placed on the internal combustion engine 1 is medium and the internal combustion engine 1 is running at medium speed. In the range HPL+LPL, high pressure EGR and low pressure EGR are performed in combination. In the range LPL in FIG. 2, the load placed on the internal combustion engine 1 is high and the internal combustion engine 1 is running at high speed. In the range LPL, low-pressure EGR is mainly performed.

Performing high-pressure EGO and low-pressure EGR in combination in the above-described manner makes it possible to perform EGR in a broader operating range. This reduces the amount of NOx generated during combustion.

The efficiency of reduction in the amount of NOx achieved by performing EGR is increased as the EGR gas amount increases. Namely, as the EGR rate (EGR gas amount/(EGR gas amount+intake air amount)) increases, the efficiency of reduction in the amount of NOx achieved by performing ER increases. However, if the EGR rate increases an increase in the fuel consumption rate of the internal combustion engine due to performance of EGR is no longer ignored.

For example, when the low-pressure EGR gas amount is increased to increase the EGR rate, the ECU 22 may execute the control to reduce the opening amount of the exhaust throttle valve 11, thus increasing the pressure difference between the upstream side and the downstream side in the low-pressure EGR passage 23. In this case, the upstream-downstream pressure difference of the exhaust throttle valve 11 increases, which increases the pumping loss at the exhaust throttle valve 11. As a result, the fuel consumption rate of the internal combustion engine 1 may increase.

Figure 3A:
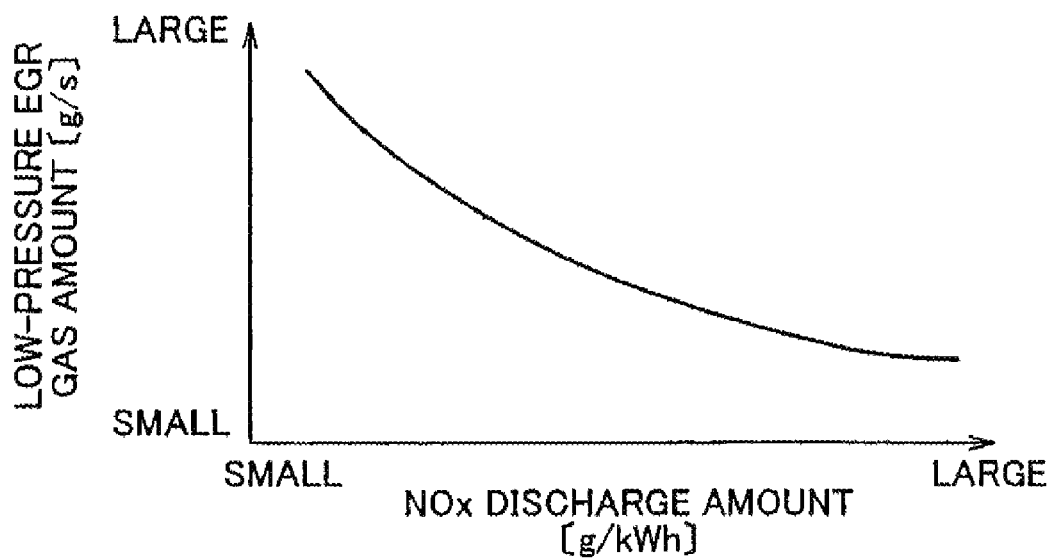
FIGS. 3A and 3B are the graphs showing the correlation between the NOx discharge amount and the low-pressure FOR gas amount/the fuel consumption rate of the internal combustion engine according to the first embodiment of the invention.
Figure 3B:
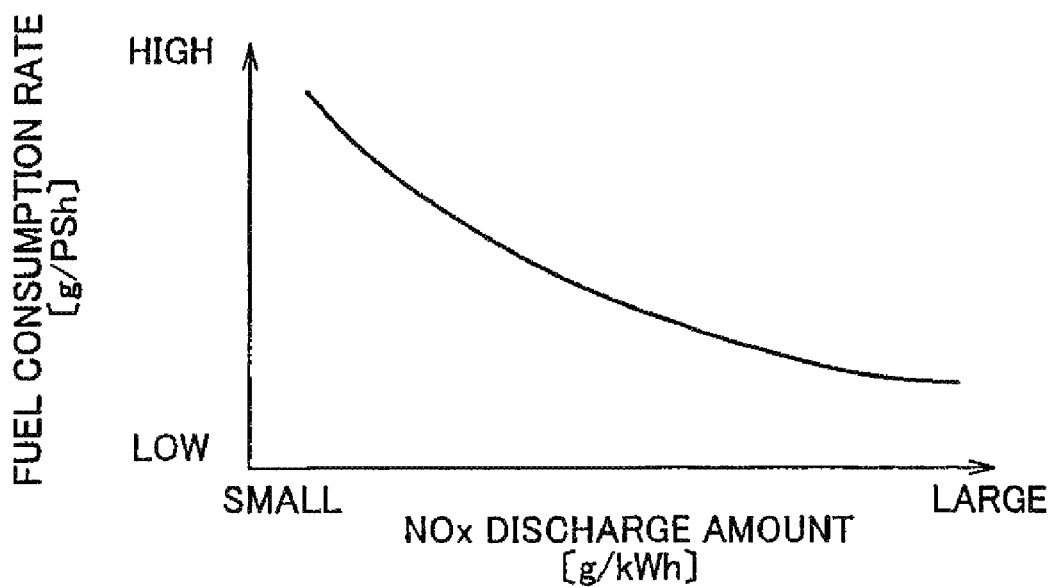

FIGS. 3A and 3B are the graphs showing the correlation between the NOx discharge amount and the low-pressure EGR gas amount, and the correlation between the NOx discharge amount and the fuel consumption rate. FIG. 3A is the graph showing the correlation between the NOx discharge amount and the low-pressure EGR gas amount. In FIG. 3A, the lateral axis represents the NOx discharge amount, and the vertical axis represents the low pressure EGR gas amount. As shown in FIG. 3A as the low-pressure EGR gas amount increases, the amount of NOx generated during combustion decreases. When the low-pressure EGR gas amount increases, the ECU 22 executes the control to decrease the opening amount of the exhaust throttle valve 11. Accordingly, the pumping loss at the exhaust throttle valve 11 increases, which increases the fuel consumption rate of the internal combustion engine 1. Therefore, as shown in FIG. 3B, the fuel consumption rate tends to increase as the amount of NOx generated during combustion decreases.

Also, when the high-pressure EGR gas amount increases, the inflow gas temperature increases, which increases the amount of smoke generated. As a result, the fuel consumption rate may increase.

As described above, there are various factors responsible for an increase in the fuel consumption rate, which have different correlations with the high-pressure EGR gas amount and the low-pressure EGR gas amount. Accordingly, the NOx reduction rate and the fuel consumption rate may be offset each other. Accordingly, when EGR is performed at a high EGR rate to increase the NOx reduction rate, it is important to set the mixture ratio between the high-pressure EGR gas and the low-pressure EGR gas based on the correlation between the mixture ratio and the fuel consumption rate so that an increase in the fuel consumption rate is suppressed as much as possible.

Therefore, in the exhaust gas control system according to the first embodiment of the invention, as shown in FIG. 2, EGR is switched between high-pressure EGR and low-pressure EGR based on the operating state of the internal combustion engine, and also the mixture ratio between the high-pressure EGR gas and the low-pressure EGR gas is set based further on the correlation between the fuel consumption rate of the internal combustion engine 1 and the mixture ratio.

The correlation between the fuel consumption rate and the mixture ratio changes depending on the various factors responsible for an increase in the fuel consumption rate as described above. Namely, the fuel consumption rate depends on the fuel consumption rate components that change depending on the respective factors responsible for an in the fuel consumption rate. Accordingly, the correlation between the fuel consumption rate and the mixture ratio depends on the correlation between each fuel consumption rate component and the mixture ratio.

Therefore, according to the first embodiment of the invention, the actual correlation between the fuel consumption rate and the mixture ratio between the high-pressure EGR gas and the low-pressure EGR gas is approximated by combining the correlations between the mixture ratio and the fuel consumption rate components that exert relatively great influence on the fuel consumption rate due to performance of EGR, that is, by combining the correlation between the mixture ratio and the fuel consumption rate component that changes depending on the inflow gas temperature (hereinafter, referred to as the "inflow gas temperature fuel consumption rate component"), with the correlation between the mixture ratio and the fuel consumption rate component that changes depending on the pumping loss caused by the pressure difference between the upstream side and the downstream side of the exhaust throttle valve 11 (hereinafter, referred to as the "throttle valve upstream-downstream pressure difference") (hereinafter, referred to as the "throttle valve fuel consumption rate component").

FIGS. 4A to 4C are the graphs showing the correlation among the inflow gas temperature fuel consumption rate component, the inflow gas temperature, and the mixture ratio between the low-pressure EGR gas and the high-pressure EGR gas. FIG. 4A is the graph showing the correlation between the inflow gas temperature TB and the inflow gas temperature fuel consumption rate component SEC (TB). In FIG. 4A, the lateral axis represents the inflow gas temperature TB, and the vertical axis represents the inflow gas temperature fuel consumption rate component SFC (TB). As the inflow gas temperature increases, the amount of smoke generated increases, which increases the fuel consumption rate. Accordingly, as shown in FIG. 4A, the inflow gas temperature fuel consumption rate component SFC (TB) increases as the inflow gas temperature TB increases. Namely, the inflow gas temperature fuel consumption rate component SFC (TB) exerts an influence on the fuel consumption rate SFC as an increasing function of the inflow gas temperature TB.

FIG. 4B is the graph showing the correlation between the mixture ratio R and the inflow gas temperature TB. The mixture ratio R is the ratio between the high-pressure EGR gas amount and the low-pressure EGR gas amount. The mixture ratio R decreases as the proportion of the high-pressure EGR gas amount to the total EGR gas amount increases, and the mixture ratio R increases as the proportion of the low-pressure EGR gas amount to the total EGR gas amount increases. In FIG. 4B, the lateral axis represents the inflow gas temperature TB and the vertical axis represents the mixture ratio R.

Because the passage length of the high-pressure EGR passage 15 is short and no EGR cooler is provided to the high-pressure EAR passage 15, the temperature of the exhaust gas flowing through the high-pressure FOR passage 15 and flows in the intake manifold 8 is high. Accordingly, as the high-pressure EGR gas amount increases, the inflow gas temperature TB increases, Namely, as shown in FIG. 4B, the inflow gas temperature TB increases as the proportion of the high-pressure EGR gas amount to the total EGR gas amount increases.

The correlations described above proves that the inflow gas temperature fuel consumption rate component SFC (TB) has a tendency to increase as the mixture ratio R changes so that the proportion of the high-pressure EGR gas amount to the total EGR gas amount increases (hereinafter, such tendency will be referred to as the "high-pressure EGR positive correlation tendency"), as shown in FIG. 4C. Namely, the inflow gas temperature fuel consumption rate component SFC (TB) in the first embodiment of the invention is regarded as the high-pressure EGR positive correlation fuel consumption rate component according to the invention.

Figure 5A:
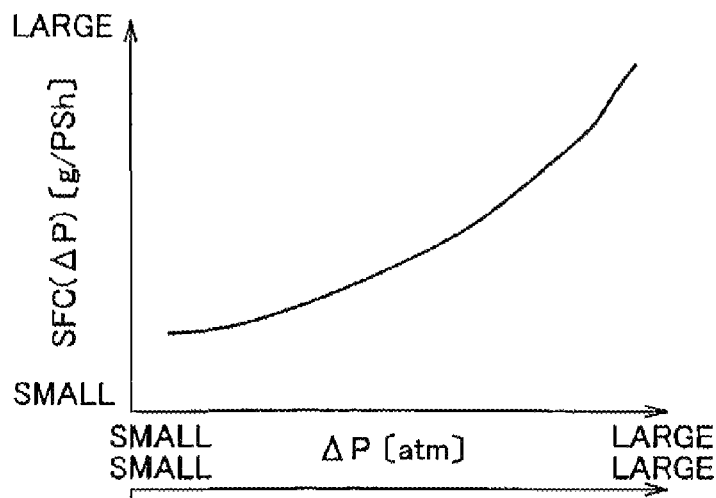
FIGS. 5A, 5B, and 5C are the graphs showing the correlation among the throttle valve fuel consumption rate component, the throttle valve upstream-downstream pressure difference, and the mixture ratio between the high-pressure EGR gas and the low-pressure EGR as according to the first embodiment of the invention.
Figure 5B:
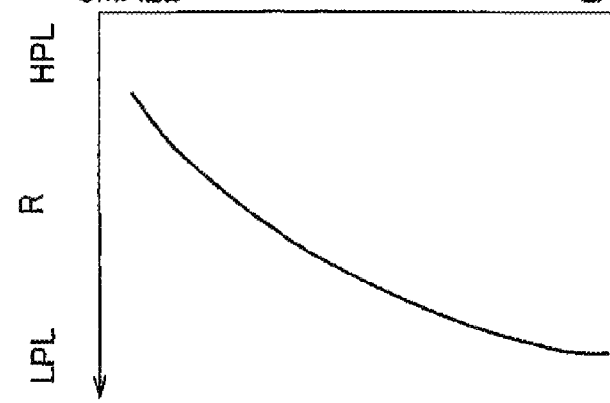
Figure 5C:
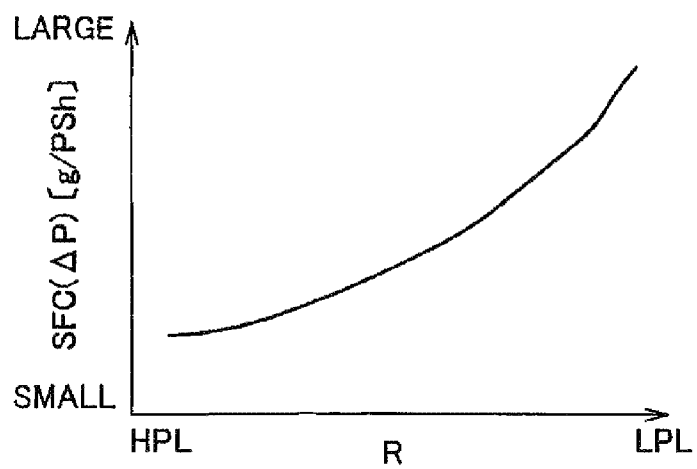

FIGS. 5A to 5C are the graphs showing the correlation among the throttle valve fuel consumption rate component, the throttle valve upstream-downstream pressure difference, and the mixture ratio between the low-pressure EGR gas and the high-pressure EGR gas. FIG. 5A is the graph showing the correlation between the throttle valve upstream-downstream pressure difference ΔP and the throttle valve fuel consumption rate component SFC (ΔP). In FIG. 5A, the lateral axis represents throttle valve upstream-downstream pressure difference ΔP, and the vertical axis represents the throttle valve fuel consumption rate component SEC (ΔP).

As the throttle valve upstream-downstream pressure difference ΔP increases, the pumping loss at the exhaust throttle valve 11 increases. As a result, the filet consumption rate increases. Namely, as shown in FIG. 5, the throttle valve fuel consumption rate component SFC (ΔP) increases as the throttle valve upstream-downstream pressure difference ΔP increases. Namely, the throttle valve fuel consumption rate component SFC (ΔP) exerts an influence on the fret consumption rate SFC as an increasing function of the throttle valve upstream-downstream pressure difference ΔP.

FIG. 5B is the graph showing the correlation between the mixture ratio R between the low-pressure EGR gas and the high-pressure EGR gas and the throttle valve upstream-downstream pressure difference ΔP. The mixture ratio R decreases as the proportion of the high-pressure EGR gas amount to the total EGR gas amount increases, and increases as the proportion of the low-pressure EGR gas amount to the total EGR gas amount increases. In FIG. 5B, the lateral axis represents the throttle valve upstream-downstream pressure difference ΔP, and the vertical axis represents the mixture ratio R.

If the opening amount of the exhaust throttle valve 11 is reduced, the pressure of the exhaust gas upstream of the exhaust throttle valve 11 increases. As a result, the pressure difference between the upstream side and the downstream side of the low-pressure EGR passage 23 increases, and, therefore, the low-pressure EGR gas amount increases. Namely, as shown in FIG. 58, the throttle valve upstream-downstream pressure difference ΔP increases as the mixture ratio R changes so that the proportion of the low-pressure EGR gas amount to the total EGR gas amount increases.

The above-described correlations proves that the throttle valve fuel consumption rate component SFC (ΔP) has a tendency to increase as the mixture ratio R changes so that the proportion of the low-pressure EGR gas amount to the total EGR gas amount increases (hereinafter, such tendency will be referred to as the "low-pressure EGR positive correlation tendency"), as shown in FIG. 5C. Namely) the throttle valve fuel consumption rate component SFC (ΔP) according to the first embodiment of the invention is regarded as the low-pressure EGR positive correlation fuel consumption rate component according to the invention.

The actual correlation between the fuel consumption rate SFC and the mixture ratio R is approximated by combining the correlations between the mixture ratio and the two fuel consumption rate components that have different correlations with the mixture ratio R, that is, by combining the correlation between the inflow gas temperature fuel consumption rate component SFC (TB) and the mixture ratio R with the correlation between the throttle valve fuel consumption rate component SFC (ΔP) and the mixture ratio R.

Figure 6:
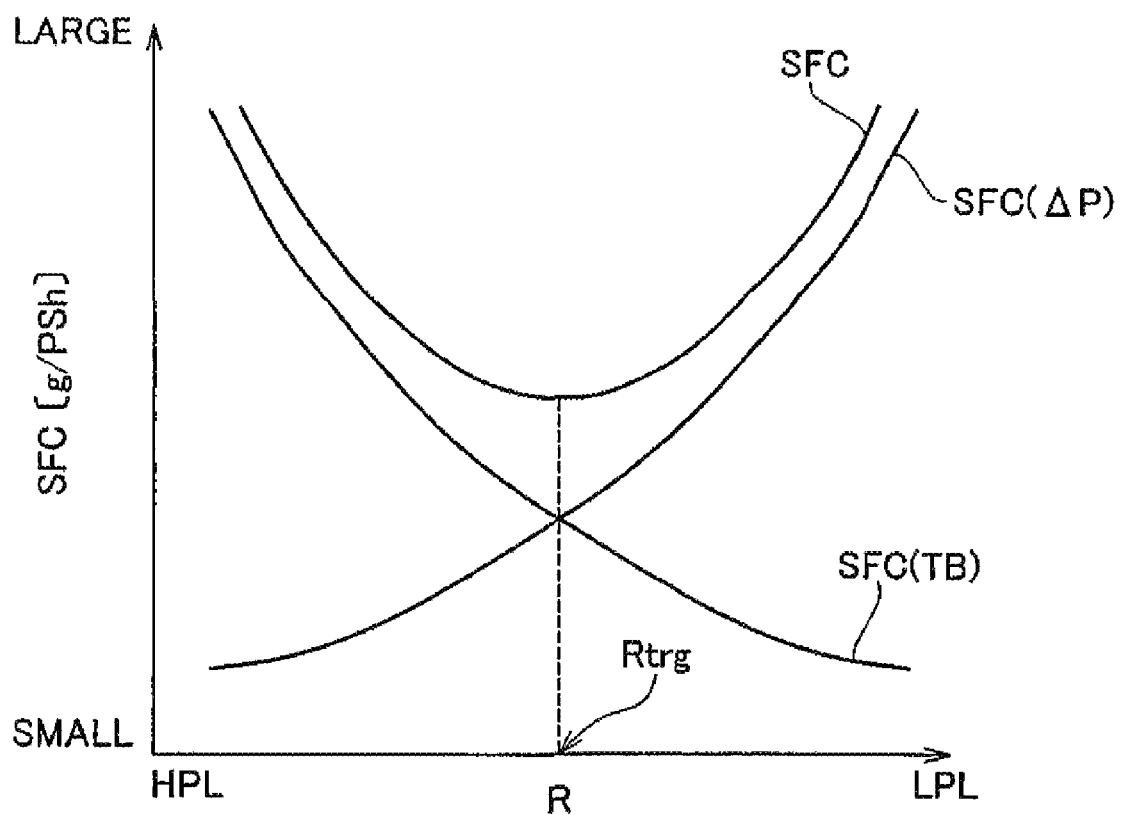
FIG. 6 is the graph showing the correlation between the inflow gas temperature fuel consumption rate component and the mixture ratio between the high-pressure EGR gas and the low-pressure EGR gas, the correlation between the throttle valve fuel consumption rate component and the mixture ratio, and the actual correlation between the filet consumption rate and the mixture ratio that is approximated by combining these two correlations together according to the first embodiment of the invention.

FIG. 6 is the graph showing the correlation between the inflow gas temperature fuel consumption rate component SFC (TB) and the mixture ratio R, the correlation between the throttle valve fuel consumption rate component SFC (ΔP) and the mixture ratio R, and the actual correlation between the fuel consumption rate SFC and the mixture ratio R that is approximated by combining these two correlations together. In FIG. 6, the lateral axis represents the mixture ratio R, and the vertical axis represents the fuel consumption rate SFC or each Gel consumption rate component.

As shown in FIG. 6, the actual correlation between the fuel consumption rate SFC and the mixture ratio R is approximated by combining the correlations between the mixture ratio and the two fuel consumption rate components that have difference correlations with the mixture ratio R together, namely; by combining the correlation between the mixture ratio R and the inflow gas temperature fuel consumption rate component SFC (TB) that has the high-pressure EGR positive correlation tendency with the correlation between the mixture ratio R and the throttle valve fuel consumption rate component SFC (ΔP) that has the low-pressure EGR positive correlation tendency. The correlation between the fuel consumption rate SFC and the mixture ratio R is indicated by a downwardly convex function shown in FIG. 6.

The opening amounts of the high-pressure EGR valve 21, the low-pressure EGR valve 5, the throttle valve 12, the exhaust throttle valve 11, etc. are controlled so that the mixture ratio R between the high-pressure ER gas and the low-pressure EGR gas is the mixture ratio Rtrg at which the fuel consumption rate SEC in FIG. 6 is the minimum valve. Thus, it is possible to perform EGR at a desired EGR rate while suppressing an increase in the fuel consumption rate as much as possible. Thus, even when the EGR rate needs to increased to increase the efficiency of NOx reduction, it is possible to increase the EGR rate while suppressing an increase in the fuel consumption rate as much as possible.

The correlation between the inflow gas temperature fuel consumption rate component SFC (TB) and the mixture ratio R, and the correlation between the throttle valve fuel consumption rate component SFC ($\Delta$P) and the mixture ratio R may change depending on the operating state of the internal combustion engine.

Figure 7:
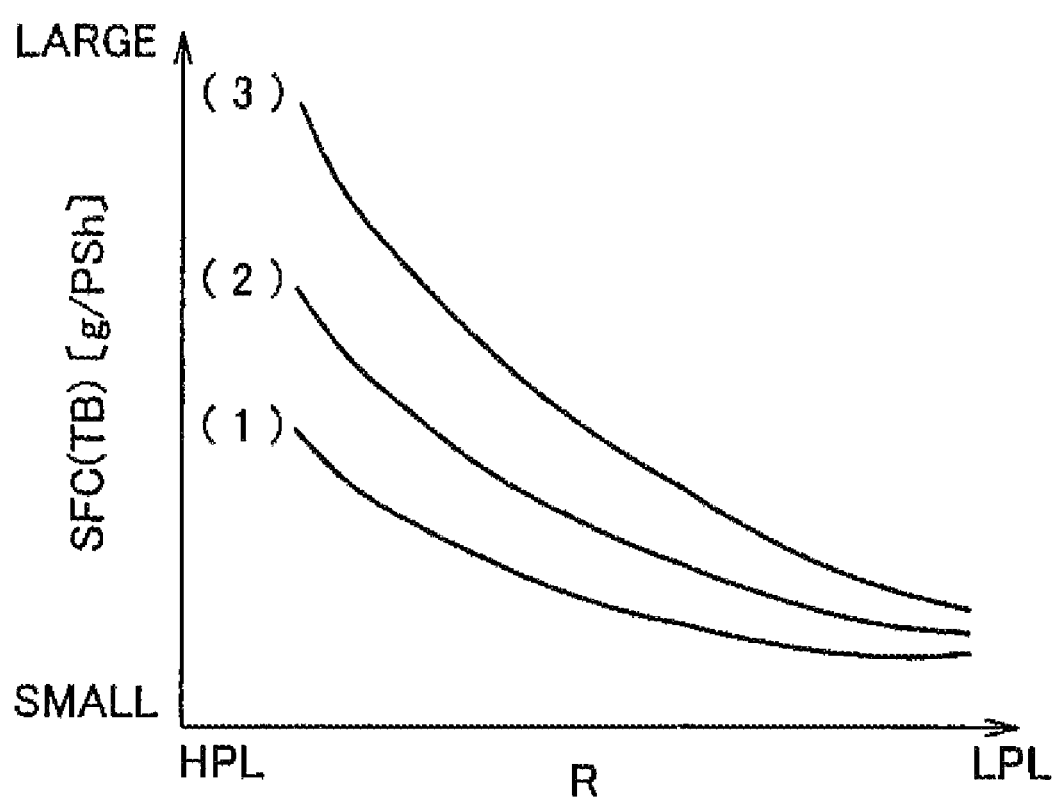
FIG. 7 is the graph showing the correlation between the inflow gas temperature fuel consumption rate component and the mixture ratio between the high-pressure EGR gas and the low-pressure EGR gas at each load placed on the internal combustion engine according to the first embodiment of the invention.

FIG. 7 is the graph showing the correlation between the inflow gas temperature fuel consumption rate component SFC (TB) and the mixture ratio R at each load placed on the internal combustion engine. In FIG. 7, the lateral axis represents the mixture ratio R, and the vertical axis represents the inflow gas temperature fuel consumption rate component SFC (TB). The line 1 in FIG. 7 shows the correlation between the inflow gas temperature fuel consumption rate component SFC (TB) and the mixture ratio R when the load placed on the internal combustion engine is low. The line 2 in FIG. 7 shows the correlation when the load placed on the internal combustion engine is medium. The line 3 in FIG. 7 shows the correlation when the load placed on the internal combustion engine is high.

As the load placed on the internal combustion engine increases, the temperature of the exhaust gas increases, and the inflow gas temperature TB also increases. As described above, the inflow gas temperature fuel consumption rate component SFC (TB) is the increasing function of the inflow gas temperature TB. Accordingly, as shown in FIG. 7, the rate of change in the inflow gas temperature fuel consumption rate component SFC (TB) with respect to a change in the mixture ratio R increases as the load placed on the internal combustion engine increases.

Figure 8:
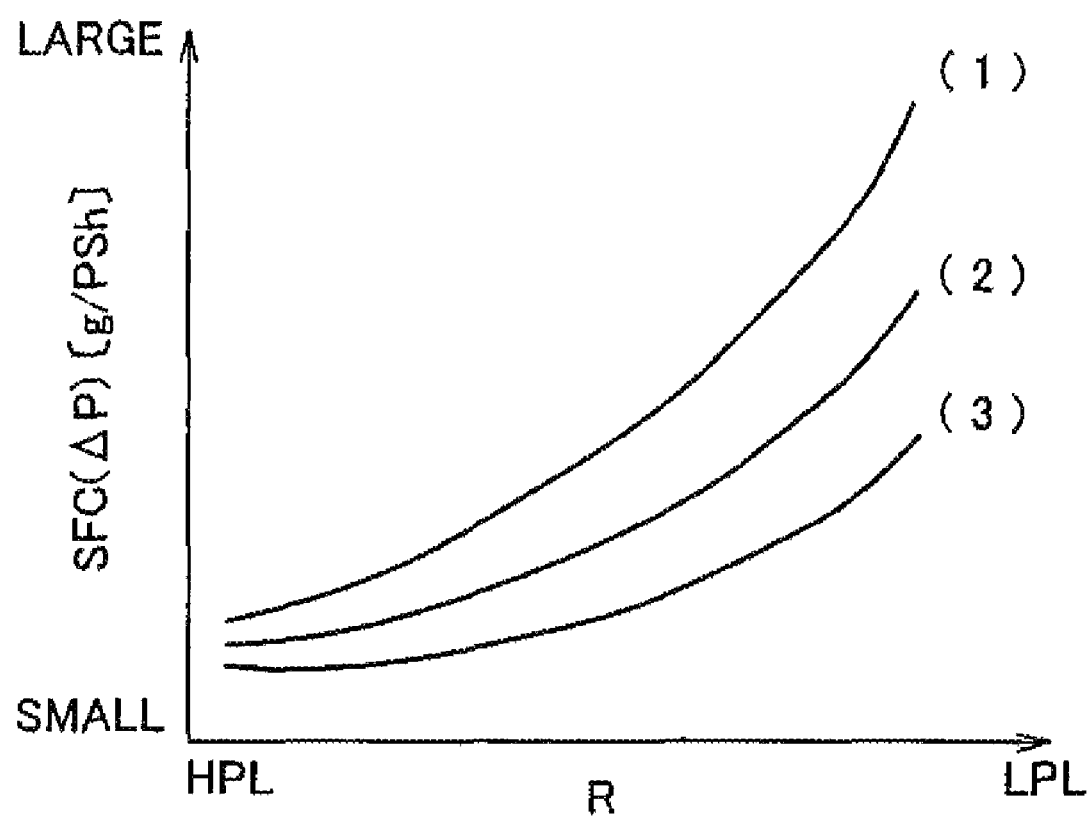
FIG. 8 is the graph showing the correlation between the throttle valve fuel consumption rate component and the mixture ratio between the high-pressure EGR gas and the low-pressure ER gas at each load placed on the internal combustion engine according to the first embodiment of the invention.

FIG. 5 is the graph showing correlation between the throttle valve fuel consumption rate component SFC ($\Delta$P) and the mixture ratio R at each load placed on the internal combustion engine. In FIG. 8, the lateral axis represents the mixture ratio R, and the vertical axis represents the throttle valve fuel consumption rate component SFC ($\Delta$P). The line 1 in FIG. 8 shows the correlation between the throttle valve fuel consumption rate component SFC ($\Delta$P) and the mixture ratio R when the load placed on the internal combustion engine is low. The line 2 in FIG. 8 shows the correlation when the load placed on the internal combustion engine is medium. The line 3 in FIG. 8 shows the correlation when the load placed on the internal combustion engine is high.

As the load placed on the internal combustion engine decreases, the pressure of the exhaust gas decreases, and the pressure difference between the upstream side and the downstream side in the low-pressure EGR passage 23 decreases. Accordingly, the opening amount of the exhaust throttle valve 11 needs to be reduced by a larger amount in order to maintain the constant low-pressure EGR gas amount. As the opening amount of the exhaust throttle valve 11 decreases, the upstream-downstream pressure difference of the exhaust throttle valve 11 increases, and the throttle valve fuel consumption rate component SFC ($\Delta$P) increases with an increase in the upstream-downstream pressure difference SEC ($\Delta$P). Therefore, as shown in FIG. 8, the rate of change in the throttle valve fuel consumption rate component SEC ($\Delta$P) with respect to a change in the mixture ratio R increases as the load placed on the internal combustion engine decreases.

Figure 9:
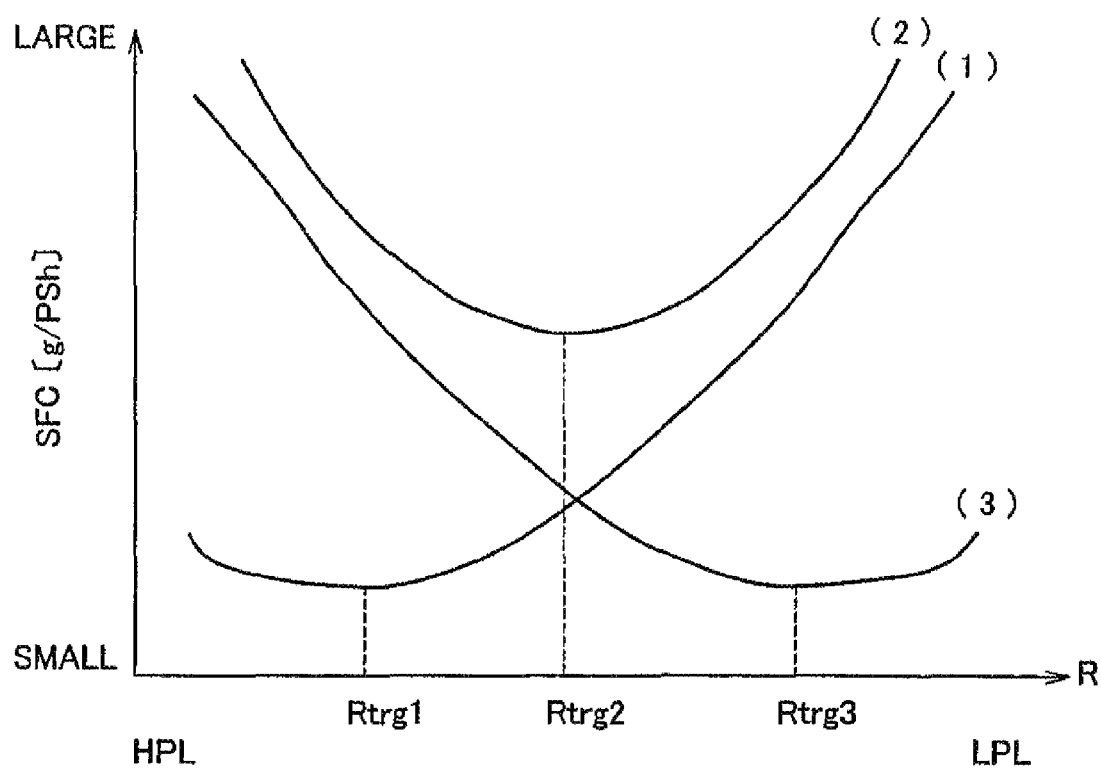
FIG. 9 is the graph showing the correlation between the fuel consumption rate and the mixture ratio between the high-pressure EGR gas and the low-pressure EGR gas at each load placed on the internal combustion engine, the actual correlation being approximated by combining the correlation between the inflow gas temperature fuel consumption rate component and the mixture ratio with the correlation between the throttle valve fuel consumption rate component and the mixture ratio according to the first embodiment of the invention.

FIG. 9 is the graph showing the correlation between the fuel consumption rate components and the mixture ratio described above at each load placed on the internal combustion engine. In FIG. 9, the lateral axis represents the mixture ratio R, and the vertical axis represents the fuel consumption rate SFC.

The line 1 in FIG. 9 shows the correlation between the fuel consumption rate SEC and the mixture ratio R when the load placed on the internal combustion engine is low. The function form is derived by combining the correlation between the inflow gas temperature fuel consumption rate component SEC (TB) and the mixture ratio R shown by the line 1 in FIG. 7 with the correlation between the throttle valve fuel consumption rate component SFC ($\Delta$P) and the mixture ratio R shown by the line 1 in FIG. 8.

The line 2 in FIG. 9 shows the correlation between the fuel consumption rate SFC and the mixture ratio R when the load placed on the internal combustion engine is medium. The function form is derived by combining the correlation between the inflow gas temperature fuel consumption rate component SFC (TB) and the mixture ratio R shown by the line 2 in FIG. 7 with the correlation between the throttle valve fuel consumption rate component SFC ($\Delta$P) and the mixture ratio R shown by the line 2 in FIG. 8.

The line 3 in FIG. 9 shows the correlation between the fuel consumption rate SFC and the mixture ratio R when the load placed on the internal combustion engine high. The function form is derived by combining the correlation between the inflow gas temperature fuel consumption rate component SFC (TB) and the mixture ratio R shown by the line 3 in FIG. 7 with the correlation between the throttle valve fuel consumption rate component SFC ($\Delta$P) and the mixture ratio shown by the line 3 in FIG. 8.

As shown by the lines 1 to 3 in FIG. 9, the function form that indicates the correlation between the fuel consumption rate and the mixture ratio changes depending on the operating state of the internal combustion engine. With such change, the mixture ratio Rtrg, at which the fuel consumption rate is the minimum value, also changes depending on the operating state of the internal combustion engine.

In FIG. 9, when the load placed on the internal combustion engine is low the fuel consumption rate is the minimum value at the mixture ratio Rtrg1. When the load placed on the internal combustion engine is medium, the fuel consumption rate is the minimum value at the mixture ratio Rtrg2. When the load placed on the internal combustion engine is high, the fuel consumption rate is the minimum value at the mixture ratio is Rtrg3. When the mixture ratio, at which the fuel consumption rate is the minimum value, is the optimum mixture ratio at the corresponding engine load, the optimum mixture ratio tends to change so that the proportion of the low-pressure EGR gas amount to the total EGR gas amount increases as the load placed on the internal combustion engine increases, as shown in FIG. 9.

The actual correlation between the fuel consumption rate SFC and the mixture ratio R is approximated with higher degree of accuracy by taking the dependency of the correlation between the fuel consumption rate component SFC and the mixture ratio R on the operating state of the internal combustion engine into account. Thus, it is possible to perform EGR at the mixture ratio between the high-pressure EGR gas and the low-pressure EGR gas, at which an increase in the fuel consumption rate is more reliably suppressed. As a result, it is possible to achieve both high EGR rate and low fuel consumption rate.

The correlation between the inflow gas temperature fuel consumption rate component SFC (TB) and the mixture ratio K the correlation between the throttle valve fuel consumption rate component SFC ($\Delta P$) and the mixture ratio R, the dependencies of these correlations on the operating state of the internal combustion engine, the optimum mixture ratio, etc. are obtained in advance through experiments, etc. and stored in the ROM of the ECU 22. The ECU 22 reads the optimum mixture ratio defined based on the operating state of the internal combustion engine, and controls the opening amounts of the high-pressure EGR valve 21, the low-pressure EGR valve 5, the throttle valve, 12, and the exhaust throttle valve 11 to perform the high-pressure EGR and the low-pressure EGR at the optimum mixture ratio.

Figure 10:
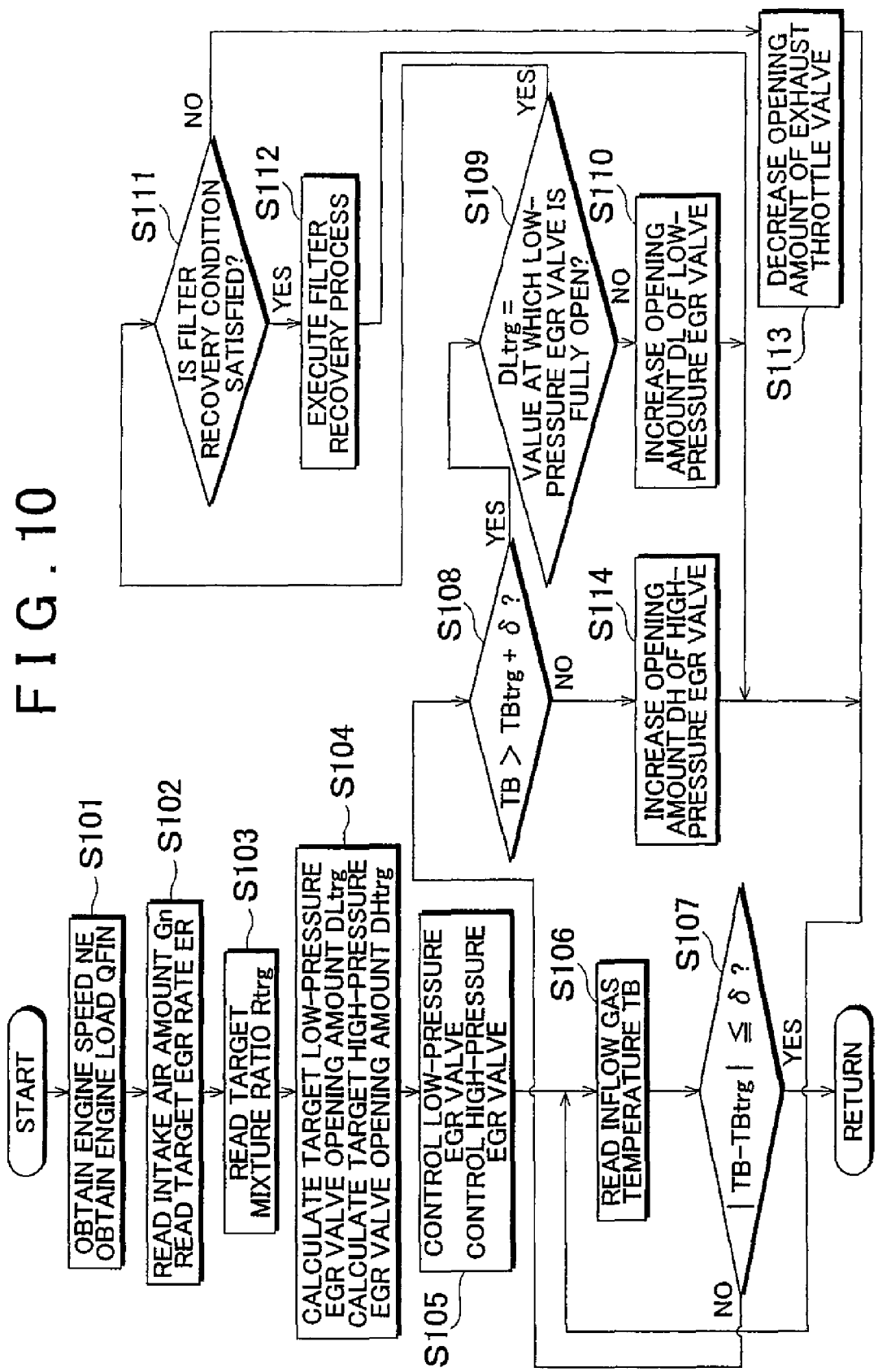
FIG. 10 is the flowchart showing the routine for controlling the opening amounts of a high-pressure EGR valve and a low-pressure EGR valve according to the first embodiment of the invention.

Hereafter, the control of the opening amounts of the high-pressure EGR valve 21 and the low-pressure EGR valve 5, executed by the ECU 22, will be described with reference to the flowchart in FIG. 10. The flowchart in FIG. 10 shows the routine of the control. The ECU 22 executes the routine at predetermined time intervals.

In step S801, the ECU 22 detects the operating state of the internal combustion engine 1. More specifically, the ECU 22 obtains the engine speed NE of the internal combustion engine 1 based on the value of the crank angle detected by the crank position sensor 25, and the engine load QFIN of the internal combustion engine 1 based on the value of the accelerator pedal operation amount detected by the acceleration pedal operation amount sensor 24.

In step S102, the ECU 22 reads the value of the intake air amount Gn detected by the airflow meter 27, and the target EGR rate ER. The target EGR rate ER is set in advance, and stored in the ROM of the ECU 22. The target ER rate ER is set as the EGR rate required to achieve the target NOx reduction rate that is set based, for example, on the exhaust gas regulation value and the margin suitable for the regulation value.

In step S103, the ECU 22 reads the target value Rtrg of the mixture ratio R between the high-pressure EGR gas and the low-pressure EGR gas. The target mixture ratio Rtrg is the optimum mixture ratio defined based on the operating state (N and QFIN) of the internal combustion engine 1, as described above. The target mixture ratio Rtrg is obtained in advance through experiments, etc. and stored in the ROM of the ECU 22 as a function or a map concerning the operating state of the internal combustion engine 1.

In step S104, the ECU 22 calculates the target value DHtrg of the opening amount DH of the high-pressure EGR valve 21 and the target value DLtrg of the opening amount DL of the low-pressure EGR valve 5 based on the intake air amount Gn and the target ER rate ER read in step S102, and the target mixture ratio Rtrg read in step S103.

In step S105, the ECU 22 controls the opening amount of the high-pressure EGR valve 21 using the target opening amount DHtrg for the high-pressure EGR valve 21 obtained in S014 as the control command value. The ECU 22 also controls the opening amount of the low-pressure EGR valve 5 using the target opening amount DLtrg for the low-pressure EGR valve 5 obtained in step S104 as the control command value.

The ECU 22 executes steps S810 to step S105. Thus, the EGR rate required to achieve the target NOx reduction rate is achieved by performing EGR using the high-pressure EGR gas and the low-pressure EGR gas that are mixed at the optimum mixture ratio. Thus, it is possible to achieve the target NOx reduction rate while suppressing an increase in the fuel consumption rate as much as possible.

Actually, the high-pressure EGR gas amount and the low-pressure EGR gas amount may deviate from the amounts estimated based on the control command values of the high-pressure EGR valve opening amount and the low-pressure EGR valve opening amount (i.e., the target high-pressure EGR gas amount and the target low-pressure EGR gas amount) due to various factors.

For example, in the first embodiment of the invention, if a great amount of PM accumulates in the filter forming the filter 20 and the pressure loss in the filter increases, the pressure of the exhaust gas downstream of the filter 20 decreases in the exhaust passage 19, and the pressure difference between the upstream side and the downstream side in the low-pressure EGR passage 23 may not be sufficient. In this case, even if the low-pressure EGR valve opening amount is controlled to the target low-pressure EGR valve opening amount, the low-pressure EGR gas amount may not reach the target low-pressure EGR gas amount. In such a case, the mixture ratio R is a value at which the proportion of the high-pressure EGR gas amount to the total EGR gas amount is greater than that at the target mixture ratio Rtrg. Accordingly, an increase in the fuel consumption rate may not be appropriately suppressed. Also, because the EGR rate may decrease, the target NOx reduction rate may not be achieved.

If the amount of PM accumulated in the filter 20 increases, the pressure of the exhaust gas between the exhaust manifold 18 and the filter 20 increases. Accordingly, the high-pressure EGR gas amount may be greater than the target high-pressure EGR gas amount. In this case as well, the mixture ratio R is a value at which the proportion of the high-pressure EGR gas amount to the total EGR gas amount is greater than that at the target mixture ratio Rtrg, which increases the intake gas temperature TB. As a result, an increase in the fuel consumption rate may not be suppressed appropriately.

To address the above, in the high-pressure EGR valve opening amount and the low-pressure EGR valve opening amount control routine according to the first embodiment of the invention, the correction routine for correcting the high-pressure EGR valve opening amount and the low-pressure EGR valve opening amount is executed. In the correction routine, the actual mixture ratio achieved due to the controls executed in step S105 is compared with the target mixture ratio, and the high-pressure EGR valve opening amount and the low-pressure EGR valve opening amount are corrected based on the results of comparison.

More specifically, the ECU 22 monitors the inflow gas temperature TB, and determines whether the mixture ratio R is equal to the target mixture ratio Rtrg. Then, the ECU 22 makes fine-adjustment of the high-pressure EGR valve opening amount and the low-pressure EGR valve opening amount based on the result of determination.

The ECU 22 monitors the inflow gas temperature TB to detect the actual mixture ratio. This is because it is considered that the inflow gas temperature TB reflects the high-pressure ER gas amount relatively accurately, because the high-pressure. ER gas passage 15 according to the first embodiment of the invention is not provided with an EGR cooler.

Figure 11A:
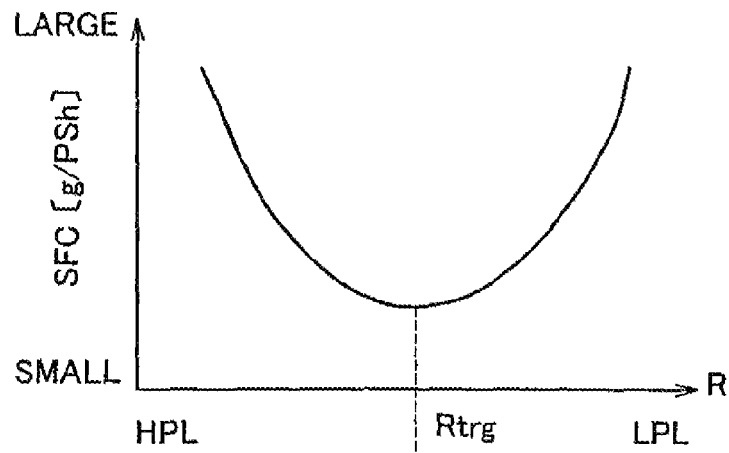
FIGS. 11A, 11B and 11C are the graphs showing the correlation among the fuel consumption rate, the inflow gas temperature, the upstream-downstream pressure difference of a throttle valve and the mixture ratio between the high-pressure FGR gas and the low-pressure EGR gas according to the first embodiment of the invention.
Figure 11B:
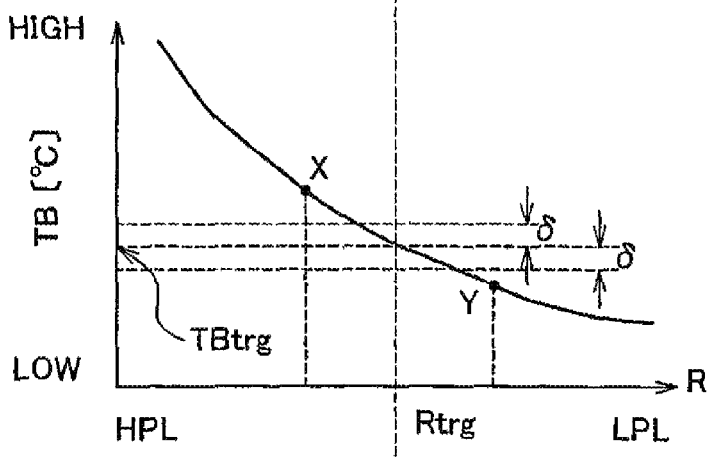
Figure 11C:
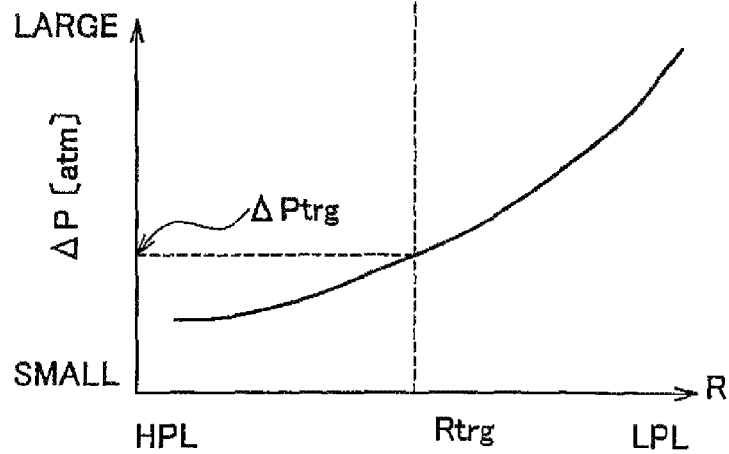

FIGS. 11A to 11C are the graphs showing the correlation among the fuel consumption rate SFC, the inflow gas temperature TB, the throttle valve upstream-downstream pressure difference $\Delta P$, and the mixture ratio R. FIG. 11A is the graph showing the correlation between the fuel consumption rate SFC and the mixture ratio R. FIG. 11B is the graph showing the correlation between the inflow gas temperature TB and the mixture ratio R. FIG. 11C is the graph showing the correlation between the throttle valve upstream-downstream pressure difference ΔP and the mixture ratio R.

As shown in FIGS. 11A and 11B, the target mixture ratio Rtrg is set to the mixture ratio at which the fuel consumption rate SFC is the minimum value and the target inflow gas temperature TBtrg is set to in the inflow gas temperature corresponding to the target mixture ratio Rtrg.

When the actual mixture ratio is a value at which the proportion of the high-pressure EGR gas amount to the total EGR gas amount is greater than that at the target mixture ratio Rtrg, as shown by the point X on the line shown in FIG. 11B, the inflow gas temperature TB is higher than the target inflow gas temperature TBtrg. On the other hand, when the actual mixture ratio is a value at which the proportion of the low-pressure EGR gas amount to the total EGR gas amount is greater than that at the target mixture ratio Rtrg, as shown by the point Y on the line shown in FIG. 11B, the inflow gas temperature TB is lower than the target inflow gas temperature TBtrg.

As described above, the ECU 22 determines whether the actual mixture ratio R deviates from the target mixture ratio by monitoring the inflow temperature TB.

In the structure where the high-pressure EGR passage 15 is provided with an EGR cooler, the ECU 22 may monitor a parameter other than the inflow gas temperature TB in order to determine whether the actual mixture ratio R deviates from the target mixture ratio.

As shown in FIG. 10, in step S106, the ECU 22 reads the value of the inflow gas temperature TB detected by the inflow gas temperature sensor 28.

In step S107, the ECU 22 determines whether the inflow gas temperature TB read in step S106 is equal to the target inflow gas temperature TBtrg. In this case, the target inflow gas temperature TBtrg is the inflow gas temperature estimated to be achieved when the mixture ratio is equal to the target mixture ratio Rtrg. The target inflow gas temperature TBtrg is obtained in advance through experiments, etc. and stored in the ROM of the ECU 22.

The description that the inflow gas temperature TB is equal to the target inflow gas temperature TBtrg means that the inflow gas temperature TB is in a predetermined temperature range including the target inflow gas temperature TBtrg. More specifically, the description that the inflow gas temperature TB is equal to the target inflow gas temperature TBtrg means that the equation |TB−TBtrg|≦predetermined value δ (>0) is satisfied.

If an affirmative determination is made in step S8107 (|TB−TBtrg|≦δ), the ECU 22 determines that the mixture ratio between the high-pressure EGR gas and the low-pressure EGR gas is equal to the target mixture ratio Rtrg, and ends the routine.

On the other hand, if a negative determination is made in step S107 ((|TB−TBtrg|>δ), the ECU 22 determines that the mixture ratio between the high-pressure EGR gas and the low-pressure EGR gas is not equal to the target mixture ratio Rtrg, and executes step S108.

In step S108, the ECU 22 determines whether the inflow gas temperature TB is higher than the target inflow gas temperature TBtrg.

If a negative determination is made in step S108 (TB<TBtgr−δ), the inflow gas temperature TB is lower than the target inflow gas temperature TBtrg. Therefore, the mixture ratio R may be deviated from the target mixture ratio Rtgr and the proportion of the low-pressure EGR gas amount to the total EGR gas amount may be greater than that at the target mixture ratio Rtrg (corresponding to the point Y on the line in FIG. 11B).

In this case, the high-pressure EGR gas amount may be less than the target high-pressure EGR gas amount. Accordingly, in step S114, the ECU 22 makes correction to increase the opening amount DH of the high-pressure FOG valve 21. Thus, the high-pressure EGR gas amount increases, and the mixture ratio approaches the target mixture ratio Rtrg. After making correction to increase the high-pressure FOR valve opening amount DH, the ECU 22 executes step S106 again.

On the other hand, if an affirmative determination is made in step S108 (TB>TBtrg−δ), the inflow gas temperature TB is higher than the target inflow gas temperature TBtrg. Therefore, the mixture ratio R may be deviated from the target mixture ratio Rtrg and the proportion of the high-pressure EGR gas amount to the total EGR gas amount may be greater than that at the target mixture ratio Rtrg (corresponding to the point X on the line in FIG. 11B).

In this case, the low-pressure EGR gas amount may be less than the target low-pressure EGR gas amount. Accordingly, the ECU 22 makes correction to increase the opening amount DL of the low-pressure EGR valve 5 to increase the low-pressure EGR gas amount. The correction control for correcting the low-pressure EGR gas amount will be described below.

In step S109, the ECU 22 determines whether the opening amount DL of the low-pressure EGR valve 5 is the value at which the low-pressure EGR valve 5 is fully open.

Whether the low-pressure EGR valve 5 is fully open is determined for the following reason. If the mixture ratio R is deviated from the target mixture ratio Rtrg and the proportion of the high-pressure EGR gas amount to the total EGR gas amount is greater than that at the target air-fuel ratio Rtrg, accumulation of a great amount of PM in the filter of the filter 20 is considered to be one of the factors. In this case, even if the low-pressure EGR valve is fully opened, the low-pressure EGR gas amount may not reach the target low-pressure EGR gas amount depending on the amount of PM accumulated in the filter. In such a case, it is difficult to change the mixture ratio from the mixture ratio, at which the proportion of the high-pressure EGR gas amount to the total EGR gas amount is greater than that at the target mixture ratio Rtrg, to the target mixture ratio Rtrg by correcting the opening amount of the low-pressure EGR valve. Accordingly, it is necessary to take measures other than correction of the low-pressure EGR valve opening amount.

If a negative determination is made in step S109, the ECU 22 makes collection to increase the opening amount DL of the low-pressure EGR valve 5, thereby increasing the low-pressure EGR gas amount. Then, the ECU 22 executes step S106 again.

On the other hand, if an affirmative determination is made in step S109, the low-pressure EGR gas amount is less than the target low-pressure EGR gas amount although the low-pressure EGR valve is fully open. In this case, a great amount of PM may accumulate in the filter that forms the filter 20 and, therefore, the pressure loss may be great. As a result, the pressure difference between the upstream side and the downstream side in the low-pressure EGR passage 23 may not be sufficiently maintained.

In order to cause the low-pressure EGR gas amount to approach the target value, the filter recovery process for oxidizing the PM accumulated in the filter to remove it needs to be performed to reduce the pressure loss in the filter. However, frequent performance of the filter recovery process may affect the durability of the filter. Accordingly, the filter recovery process should be performed only when a predetermined condition is satisfied (hereinafter, referred to as the "filter recovery condition").

Examples of the filter recovery condition are the condition that the amount of PM accumulated in the filter is equal to or greater than a predetermined amount, the condition that the operating time of the internal combustion engine 1 that has elapsed since the immediate preceding filter recovery process is performed is equal to or longer than a predetermined time, etc.

Accordingly, if an affirmative determination is made in step S109, the ECU 22 determines in step S111 whether the filter recovery condition is satisfied. If an affirmative determination is made in step S111, the ECU 22 executes step S112 to perform the filter recovery process. Thus, the amount of PM accumulated in the filter is reduced, which reduces the pressure loss in the filter. As a result, the pressure difference between the upstream side and the downstream side in the low-pressure EGR gas passage 23 is sufficiently maintained. Therefore, the low-pressure EGR gas amount increases, which allows the mixture ratio to approach the target mixture ratio Rtrg.

On the other hand, if a negative determination is made in step S111, it is necessary to produce a sufficient pressure difference between the upstream side and the downstream side in the low-pressure EGR passage 23 by a process other than the filter recovery process. In this case, in step S113, the ECU 22 executes the control to reduce the opening amount of the exhaust throttle valve 11.

Thus, the pressure difference between the upstream side and the downstream side in the low-pressure EGR passage 23 is increased. In this case, because the opening amount of the exhaust throttle valve 11 is reduced, the pumping loss at the exhaust throttle valve 11 may increase, which may increase the fuel consumption rate. However, because a shortfall in the EGR gas amount is covered) the target EGR rate is achieved. As a result, the target NOx reduction rate is achieved.

As described above, in the first embodiment of the invention, the predetermined condition is the condition that the NOx reduction rate is the predetermined target NOx reduction rate (for example, the target NOx reduction rate that is set based on the regulation value of the exhaust gas and the margin suitable for the regulation value). The mixture ratio between the low-pressure EGR gas and the high-pressure EGR gas is set so that an increase in the fuel consumption rate is suppressed as much as possible under this condition. Accordingly, as in step S113, the low-pressure EGR gas and the high-pressure EGR gas may be mixed at a mixture ratio that slightly deviates from the mixture ratio at which the fuel consumption rate is the minimum value.

ii Second Embodiment

Next, a second embodiment of the invention will be described.

Figure 12:
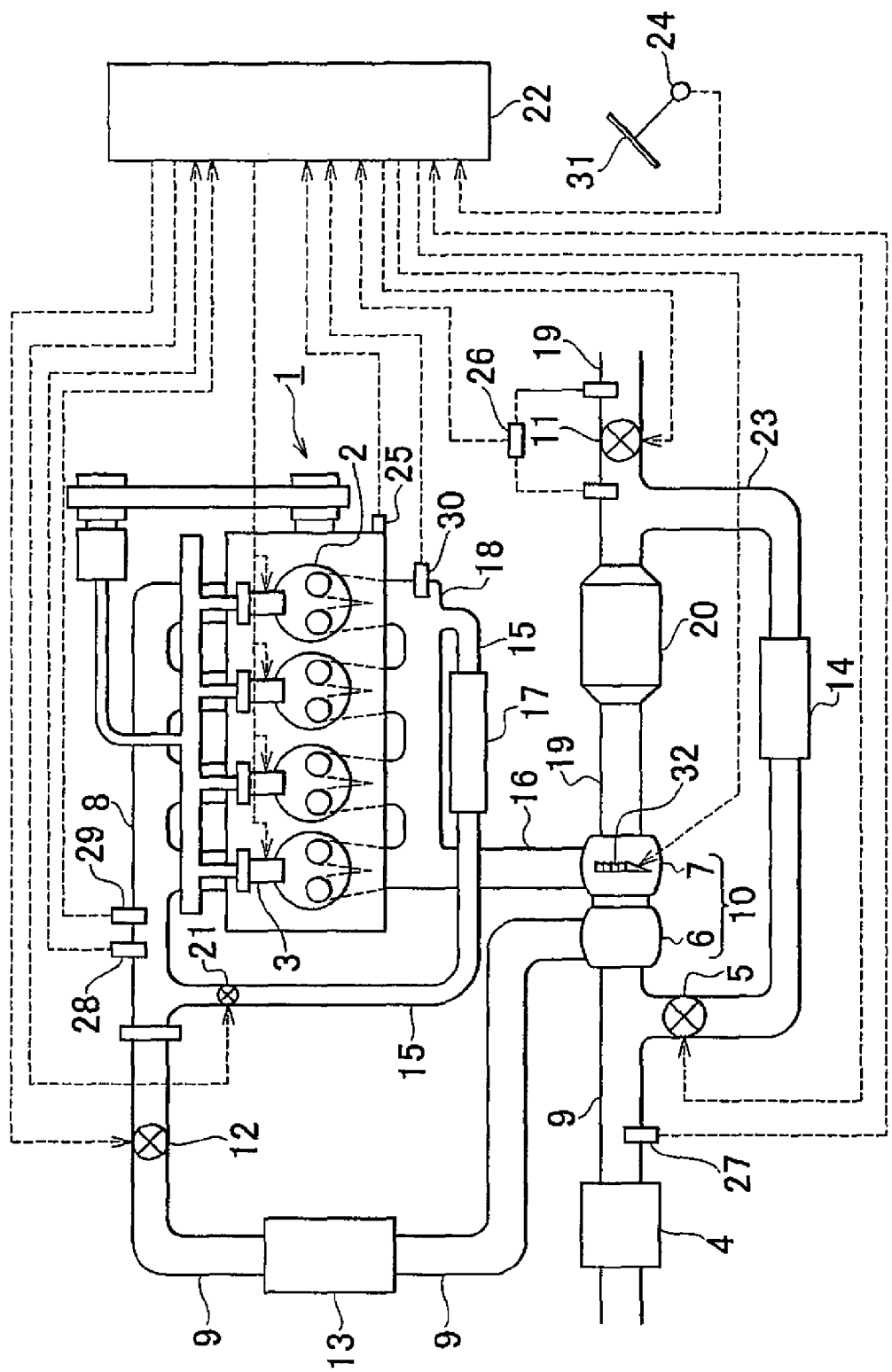
FIG. 12 is the view schematically showing the structure of an internal combustion engine and intake/exhaust systems thereof according to a second embodiment of the invention.

FIG. 12 is the view schematically showing the structure of the internal combustion engine 1 and the intake/exhaust systems thereof according to the second embodiment of the invention. The second embodiment differs from the first embodiment in the following points.

The intake manifold 8 is provided with an inflow gas pressure sensor 29 that detects the pressure of the gas in the intake manifold 8 (hereinafter, referred to as the "inflow gas pressure").

A high-pressure EGR cooler 17 that cools the high-pressure EGR gas is provided at the middle portion of the high-pressure EGR passage 15.

The exhaust manifold 18 is provided with an outflow gas pressure sensor 30 that detects the pressure of the gas in the exhaust manifold 18 (hereinafter, referred to as the "outflow gas pressure").

The turbine housing 7 of the turbocharger 10 is provided with a nozzle vane 32 that changes the amount of exhaust gas flowing in the turbine. The boost pressure of the turbocharger 10 is continuously changed by adjusting the opening amount of the nozzle vane 32.

The inflow gas pressure sensor 29 and the outflow gas pressure sensor 30 are connected to the ECU 22 via electric wiring. The signals indicating the results of detection performed by these sensors are transmitted to the ECU 22. A drive unit for the nozzle vane 32 is connected to the ECU 22 via electric wiring, and the opening amount of the nozzle vane 32 is adjusted based on the control signals from the ECU 22.

In the following description, the components of the internal combustion engine 1 and the intake/exhaust systems thereof, which are the same as those in the first embodiment of the invention are denoted by the same names and reference numbers, and the detailed descriptions thereof are omitted.

In an internal combustion engine provided with a variable capacity turbocharger, for example, the turbocharger 10 according to the second embodiment of the invention, even if the high-pressure EGR gas amount increases and the amount of exhaust gas that drives the turbine is reduced, decreases in the boost pressure is suppressed by reducing the opening amount of the nozzle vane 32. In this case, however, the turbine upstream-downstream pressure difference increases, which may increase the pumping loss in the turbine. As a result, the fuel consumption rate may increase.

Therefore, with the structure according to the second embodiment of the invention, when the above-described boost pressure control is executed by the variable nozzle turbocharger, the fuel consumption rate component that changes depending on the turbine upstream-downstream pressure difference (hereinafter, referred to as the "variable nozzle fuel consumption rate component") is one of the fuel consumption rate components that relatively greatly contribute to the changes in the fuel consumption rate due to performance of EGR.

Accordingly, in the second embodiment of the invention, an actual change in the fuel consumption rate of the internal combustion engine 1 due to performance of EGR is approximated by combining the correlation between the variable nozzle fuel consumption rate component and the mixture ratio with the correlation between the throttle valve fuel consumption rate component and the mixture ratio.

Figure 13A:
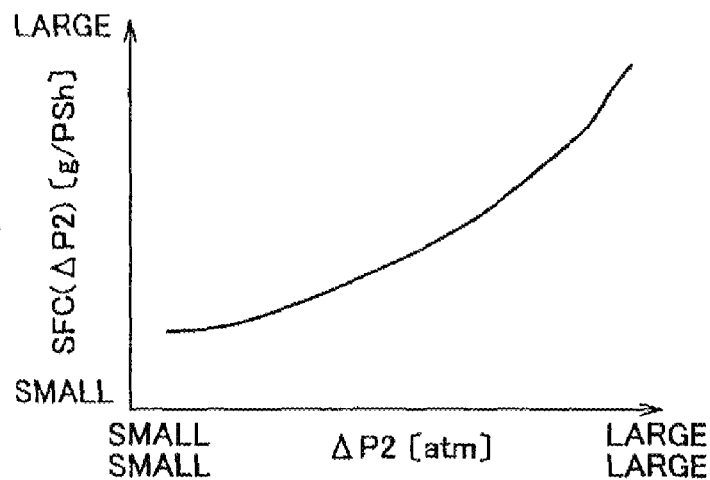
FIGS. 13A, 13B and 13C are the graphs showing the correlation among the variable nozzle fuel consumption rate component, the upstream-downstream pressure difference of a turbine, and the mixture ratio between the high-pressure EGR gas and the low-pressure EGR gas according to a second embodiment of the invention.
Figure 13B:
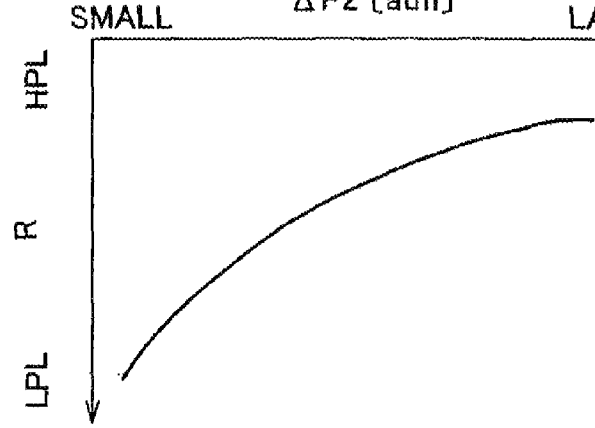
Figure 13C:
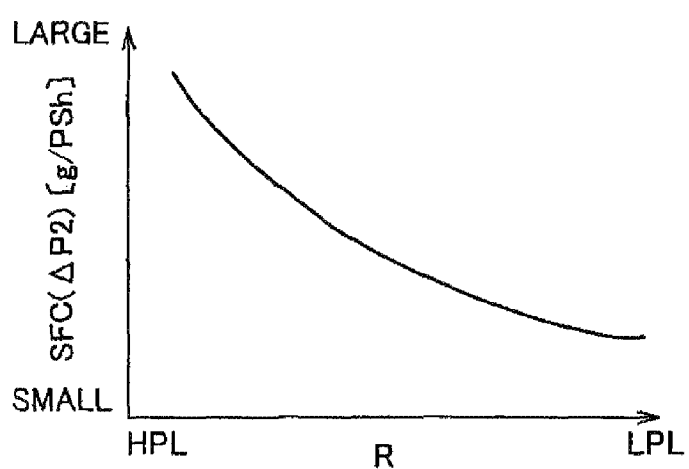

FIGS. 13A to 13C are the graphs showing the correlation among the variable nozzle fuel consumption rate component the turbine upstream-downstream pressure difference, and the mixture ratio. FIG. 13A is the graph showing the correlation between the turbine upstream-downstream pressure difference $\Delta P2$ and the variable nozzle fuel consumption rate component SFC ($\Delta P2$). In FIG. 13A, the lateral axis represents the turbine upstream-downstream pressure difference $\Delta P2$, and the vertical axis represents the variable nozzle fuel consumption rate component SFC ($\Delta P2$).

If the turbine upstream-downstream pressure difference $\Delta P2$ increases, the pumping loss in the turbine increase. As a result, the fuel consumption rate increases. Namely, as shown in FIG. 13A, the variable nozzle fuel consumption rate component SFC ($\Delta P2$) increases as the turbine upstream-downstream pressure difference $\Delta P2$ increases. The variable nozzle fuel consumption rate component SFC ($\Delta P2$) exerts an influence on the fuel consumption rate SFC as an increasing function of the turbine upstream-downstream pressure difference $\Delta P2$.

FIG. 13B is the graph showing the correlation between the mixture ratio R and the turbine upstream-downstream pressure difference $\Delta P2$. In FIG. 13B, the lateral axis represents the turbine upstream-downstream pressure difference $\Delta P2$, and the vertical axis represents the mixture ratio R. As described above, if the opening amount of the nozzle vane 32 is reduced with an increase in the high-pressure EGR gas amount, the turbine upstream-downstream pressure difference $\Delta P2$ increases, Namely, as shown in FIG. 13B, the turbine upstream-downstream pressure difference $\Delta P2$ increases as the mixture ratio R changes so that the proportion of the high-pressure EGR gas amount to the total EGR gas amount increases.

Based on the correlations described above, as shown in FIG. 13C, the variable nozzle fuel consumption rate component SFC ($\Delta P2$) has the high-pressure EGR positive correlation tendency with the mixture ratio R (the variable nozzle fuel consumption rate component SFC ($\Delta P2$) tends to increase as the mixture ratio R changes so that the proportion of the high-pressure EGR gas amount to the total FOR gas amount increases), Namely, the variable nozzle fuel consumption rate component SFC ($\Delta P2$) according to the second embodiment of the invention is regarded as the high-pressure EGR positive correlation fuel consumption rate component according to the invention.

Figure 14A:
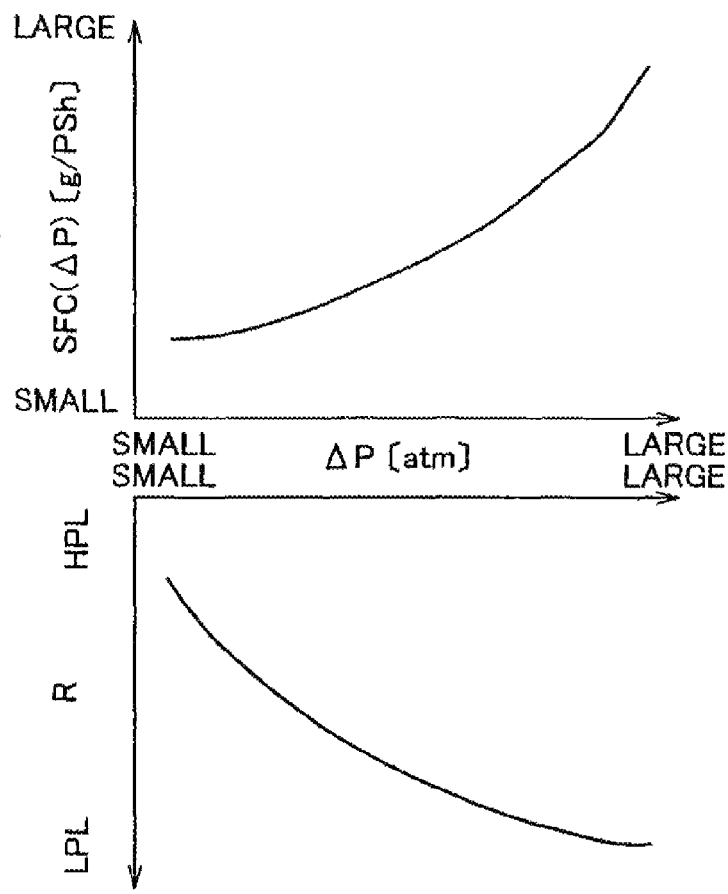
FIGS. 14A, 14B and 14C are the graphs showing the correlation among the throttle valve fuel consumption rate component, the upstream-downstream pressure difference of the throttle valve and the mixture ratio between the high-pressure EGR gas and the low-pressure EGR gas according to the second embodiment of the invention.
Figure 14B:
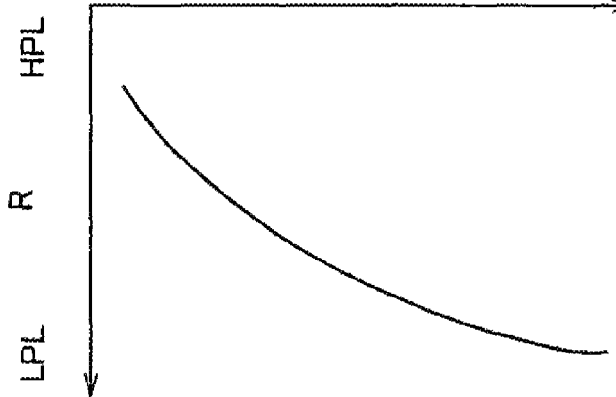
Figure 14C:
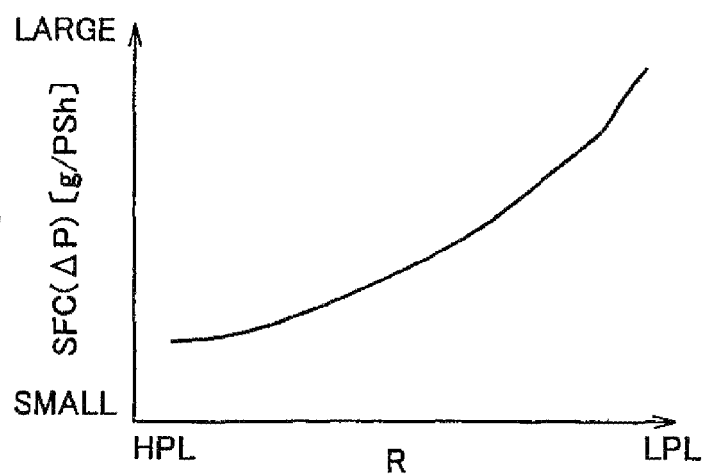

FIGS. 14A to 14C are the graphs showing the correlation among the throttle valve fuel consumption rate component, the throttle valve upstream-downstream pressure difference, and the mixture ratio. FIG. 14A is the graph showing the correlation between the throttle valve upstream-downstream pressure difference $\Delta P$ and the throttle valve fuel consumption rate component SFC ($\Delta P$). In FIG. 14A, the lateral axis represents the throttle valve upstream-downstream pressure difference $\Delta P$, and the vertical axis represents the throttle valve fuel consumption rate component SFC ($\Delta P$).

As the throttle valve upstream-downstream pressure difference $\Delta P$ increases, the pumping loss in the exhaust gas throttle valve 11 increases. As a result, the fuel consumption rate increases, Namely, as shown in FIG. 14A, the throttle valve fuel consumption rate component SFC ($\Delta P$) increases as the throttle valve upstream-downstream pressure difference $\Delta P$ increases. Namely, the throttle valve fuel consumption rate component SFC ($\Delta P$) exerts an influence on the fuel consumption rate SFC as an increasing function of the throttle valve upstream-downstream pressure difference $\Delta P$.

FIG. 14B is the graph showing the correlation between the mixture ratio R and the throttle valve upstream-downstream pressure difference $\Delta P$. In FIG. 143, the lateral axis represents the throttle valve upstream-downstream pressure difference $\Delta P$, and the vertical axis represents the mixture ratio R. If the opening amount of the exhaust throttle valve 11 is reduced, the pressure of the exhaust gas upstream of the exhaust throttle valve 11 increases. As a result, the pressure difference between the upstream side and the downstream side in the low-pressure EGR passage 23 increases, and the low-pressure EGR gas amount increases, Namely, as shown in FIG. 14B, the throttle valve upstream-downstream pressure difference $\Delta P$ increases as the mixture ratio R changes so that the proportion of the low-pressure EGR gas amount to the total EGR gas amount increases.

Based on the correlations described above, as shown in FIG. 14C, the throttle valve fuel consumption rate component SFC ($\Delta P$) has the low-pressure EGR positive correlation tendency with the mixture ratio R (the throttle valve fuel consumption rate component SFC ($\Delta P$) tends to increase as the mixture ratio R changes so that the proportion of the low-pressure EGR gas amount to the total EGR gas amount increases). Namely the throttle valve fuel consumption rate component SFC ($\Delta P$) according to the second embodiment of the invention is regarded as the low-pressure EGR positive correlation fuel consumption rate component according to the invention.

The actual correlation between the fuel consumption rate SFC and the mixture ratio R is approximated by combining the correlation between the variable nozzle fuel consumption rate component SFC ($\Delta P2$) and the mixture ratio R with the correlation between the throttle valve fuel consumption rate component SFC ($\Delta P$) and the mixture ratio R.

Figure 15:
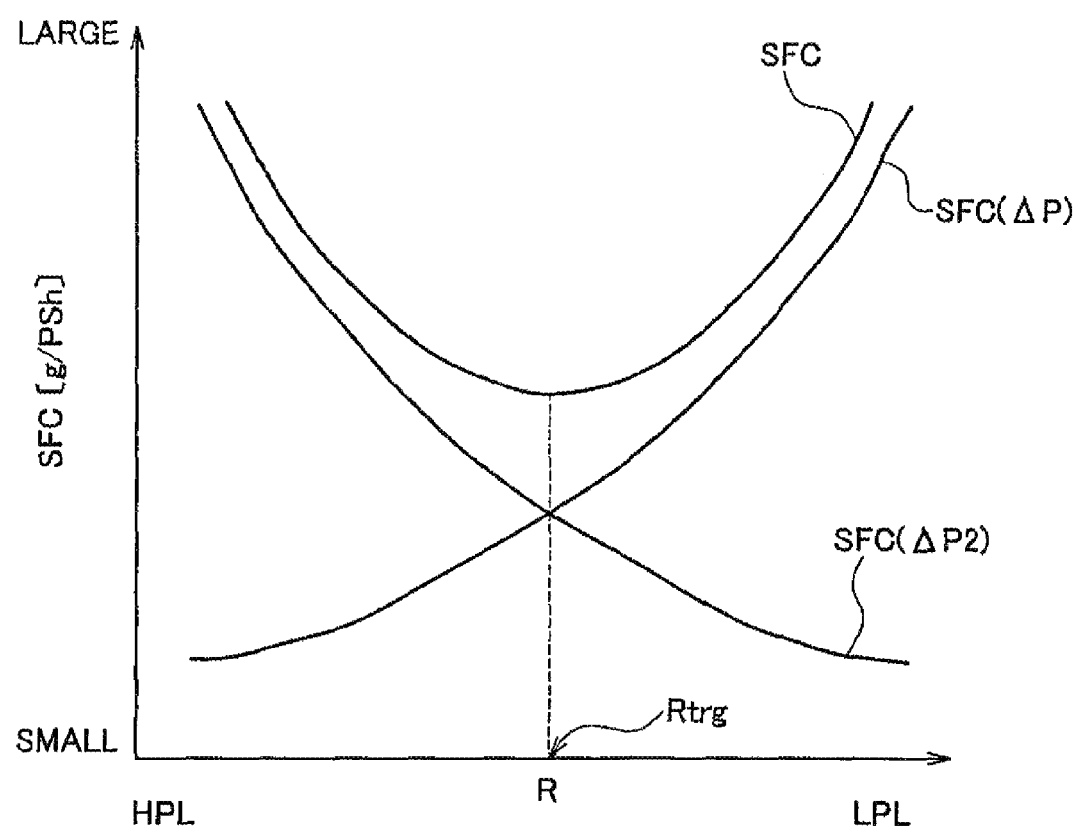
FIG. 15 is the graph showing the correlation between the variable nozzle fuel consumption rate component and the mixture ratio between the high-pressure EGR gas and the low-pressure EGR gas, the correlation between the throttle valve fuel consumption rate component and the mixture ratio, and the actual correlation between the fuel consumption rate and the mixture ratio that is approximated by combining these two correlations together according to the second embodiment of the invention.

FIG. 15 is the graph showing the correlation among the fuel consumption rate SFC, the variable nozzle fuel consumption rate component SFC ($\Delta P2$), the throttle valve fuel consumption rate component SFC ($\Delta P$), and the mixture ratio R. In FIG. 15, the lateral axis represents the mixture ratio R, and the vertical axis represents the fuel consumption rate SFC or the fuel consumption rate component.

As shown in FIG. 15, the actual correlation between the fuel consumption rate SFC and the mixture ratio R is approximated by combining the correlations between the mixture ratio R and the variable nozzle fuel consumption rate component SFC ($\Delta P2$) having the high-pressure EGR positive correlation tendency with the correlation between the mixture ratio R and the throttle valve fuel consumption rate component SFC ($\Delta P$) having the low-pressure EGR positive correlation tendency. The correlation between the fuel consumption rate SFC and the mixture ratio R is expressed by the downwardly convex function.

Accordingly, the opening amounts of the high-pressure EGR valve 21, the low-pressure EGR valve 5, the throttle valve 12, the exhaust throttle valve 11, the nozzle vane 32, etc. are controlled so that the mixture ratio between the high-pressure EGR gas and the low-pressure EGR gas is equal to the mixture ratio Rtrg at which the fuel consumption rate SFC is the minimum value on the line in FIG. 15. Thus, it is possible to perform EGR at a desired EGR rate while suppressing an increase in the fuel consumption rate as much as possible. Thus, even when the EGR rate needs to be increased to increase the efficiency of NOx reduction, it is possible to increase the EGR rate while suppressing an increase in the fuel consumption rate as much as possible.

The correlation between the variable nozzle fuel consumption rate component SFC ($\Delta P2$) and the mixture ratio t, the correlation between the throttle valve fuel consumption rate component SEC ($\Delta P$) and the mixture ratio R, the dependencies of these correlations on the operating sate of the internal combustion engine, the optimum mixture ratio, etc. are obtained in advance through experiments, etc. and stored in the ROM of the ECU 22. The ECU 22 reads the optimum mixture ratio corresponding to the operating state of the internal combustion engine 1, and controls the opening amounts of the high-pressure EGR valve 21 and the low-pressure EGR valve 5 to perform high-pressure EGR and low-pressure EGR at the optimum mixture ratio.

The opening amount control routine and the opening amount correction routine for the high-pressure EGR valve 21 and the low-pressure FOR valve 5, which are executed by the ECU 22, are the same as those according to the first embodiment. Accordingly, the detailed descriptions thereof are omitted.

In the second embodiment of the invention, the high-pressure EGR gas is cooled in the high-pressure EGR cooler 17. Accordingly, increases/decreases in the high-pressure EGR gas amount are less likely to be reflected on the inflow gas temperature TB than in the first embodiment of the invention. Accordingly, in the second embodiment of the invention, a parameter other than the inflow gas temperature TB may be monitored to detect the actual mixture ratio. For example, the deviation of the actual mixture ratio from the mixture ratio, which is estimated based on the control command values of the opening amount of the high-pressure EGR valve and the opening amount of the low-pressure EGR valve, may be detected based on the inflow gas pressure, the difference between the inflow gas pressure and the outflow gas pressure, etc.

The embodiments of the invention that have been described above are to be considered in all respects as illustrative and not restrictive. All changes which come within the meaning and range of equivalency of the invention are therefore intended to be embraced therein. For example, according to the embodiments of the invention described above, the actual correlation between the fuel consumption rate of the internal combustion engine and the mixture ratio is approximated by combining multiple correlations, for example, the correlation between the fuel consumption rate components and the mixture ratio, such as the correlation between the inflow gas temperature fuel consumption rate component and the mixture ratio, the correlation between the throttle valve fuel consumption rate component and the mixture ratio, and the correlation between the variable nozzle fuel consumption rate component and the mixture ratio. However, the fuel consumption rate components used to obtain the correlation between the fuel consumption rate and the mixture ratio are not limited to the components described above. For example, the passage resistance fuel consumption rate component that changes depending on the passage resistance in the high pressure EGR passage or the low-pressure EGR passage may be used. The passage resistance fuel consumption rate component exerts a greater influence on the fuel consumption rate in the low EGR performed in the longer passage than in the high-pressure EGR.

The correlation between the variable nozzle fuel consumption rate component SFC ($\Delta P2$) and the mixture ratio R shown in FIG. 13 may be defined based on at least one of the correlation between the mixture ratio and the high-pressure EGR high load positive correlation fuel consumption rate component that exerts an influence on the fuel consumption rate so that the fuel consumption rate increases as the load placed on the internal combustion engine increases, and the correlation between the mixture ratio and the high-pressure EGR low load positive correlation fuel consumption rate component that exerts an influence on the fuel consumption rate so that the fuel consumption rate increases as the load placed on the internal combustion engine decreases.

The correlation between the throttle valve fuel consumption rate component SFC ($\Delta P$) and the mixture ratio OR shown in FIG. 14C may be defined based on at least one of the correlation between mixture ratio and the high-pressure EGR high toad positive correlation filet consumption rate component that exerts an influence on the fuel consumption rate so that the fuel consumption rate increases as the load placed on the internal combustion engine increases, and the correlation between the mixture ratio and the high-pressure EGR low load positive correlation fuel consumption rate component that exerts an influence on the filet consumption rate so that the fuel consumption rate increases as the load placed on the internal combustion engine decreases.

In the correction control for correcting the high-pressure EGR valve opening amount and the low-pressure EGR valve opening amount, the response of the high-pressure EGR valve to the correction control is quick because the high-pressure ER passage is short (the inflow gas temperature TB starts changing quickly in response to the correction control, in the first embodiment of the invention). In contrast, the response of the low-pressure EGR valve to the correction control tends to be slow (the flow gas temperature TB starts changing slowly in response to the correction control, in the first embodiment of the invention), because the low-pressure EGR passage is long. Accordingly, in correction control for correcting the valve opening amount, the opening amount of the high-pressure EGR valve may be corrected by performing feedback control, and low-pressure EGR valve opening amount may be corrected by performing open-loop control.

As described above) the low-pressure EGR gas amount does not start changing quickly in response to the control of the opening amount of the low-pressure EGR valve. Accordingly, when the mixture ratio is a value at which the proportion of the low-pressure EGR gas amount to the total EGR gas amount is greater than the proportion of the high-pressure EGR gas amount to the total FOR gas amount, if the load placed on the internal combustion engine abruptly changes, for example, if the vehicle is accelerated suddenly, the EGR rate may not reach the required FOR rate. In this case, the response is delayed until the oxygen concentration in the intake gas reaches the required oxygen concentration, and the air-fuel mixture may not be burned in an appropriate manner.

Accordingly, a predetermined limit value is set so that the mixture ratio, at which the proportion of the low-pressure EGR gas amount to the total EGR gas amount is greater than the proportion of the high-pressure EGR gas amount to the total EGR gas amount, is limited. If the optimum mixture ratio according to the invention is a value which exceeds the limit value and at which the proportion of the low-pressure ER gas amount to the total EGR gas amount is greater than that at the limit value, the target mixture ratio may be set to the limit value instead of the optimum mixture ratio. Thus, it is possible to suppress an increase in the fuel consumption rate as much as possible. In addition, it is possible to increase the NOx reduction rate while maintaining the drivability during sudden acceleration.

Figure 16:
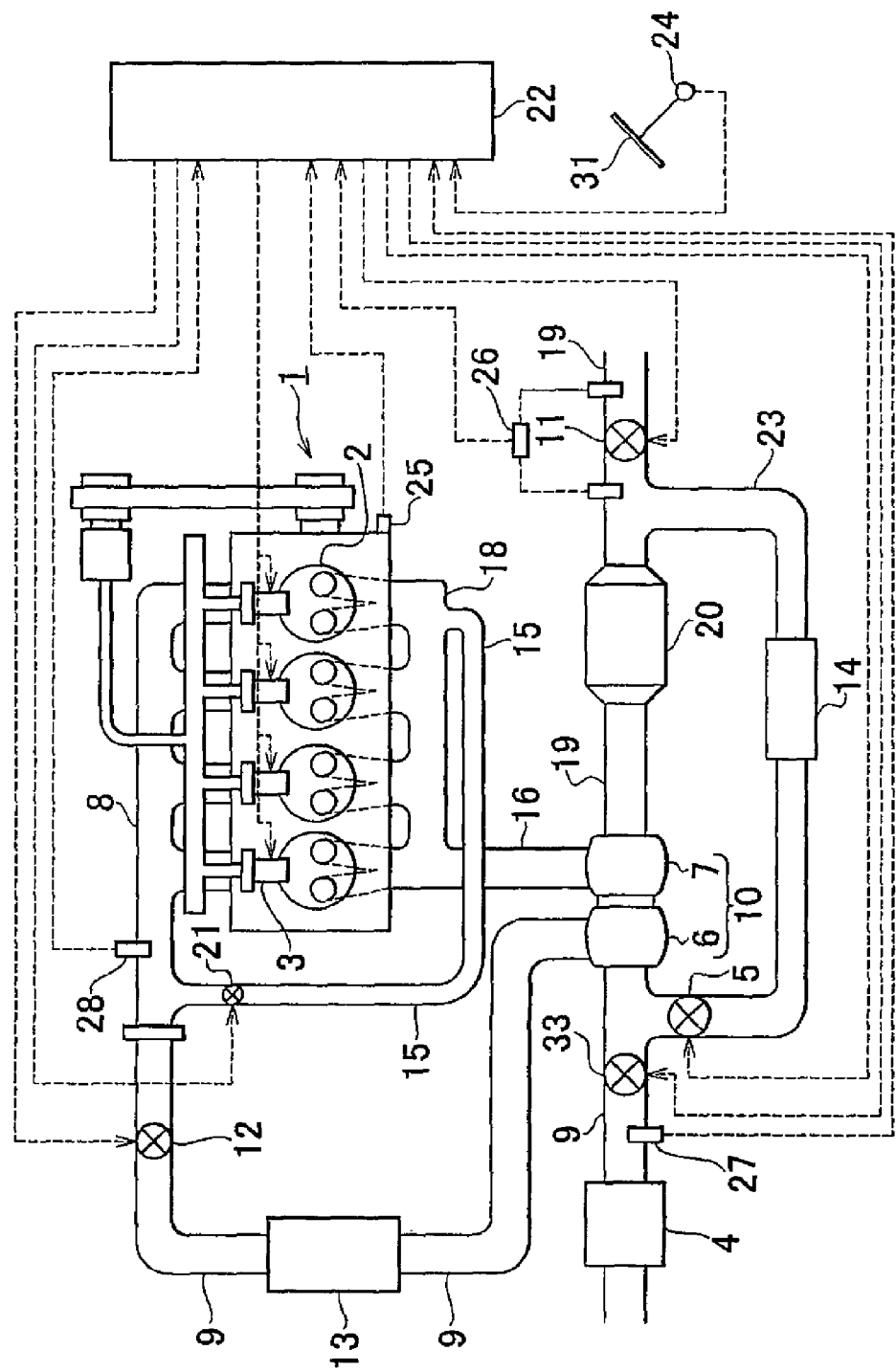
FIG. 16 is the view schematically showing the structure in which the throttle valve is an intake throttle valve in the first embodiment of the invention.

In the embodiments described above, when the pressure difference between the upstream side and the downstream side in the low-pressure EGR passage 23 needs to be increased, the opening amount of the exhaust throttle valve 11 is reduced. However, the same effects can be obtained by providing an intake throttle valve 33 upstream of the compressor housing 6 in the intake passage 9 as shown in FIG. 16, and reducing the opening amount of the intake throttle valve 33. In this case, the pumping loss caused by reducing the opening amount of the intake throttle valve 33 and the increase in the fuel consumption rate due to the pumping loss have the same characteristics as those in the case where the exhaust throttle valve 11 is provided.

The correction control for correcting the opening amounts of the high-pressure EGR valve and the low-pressure FOR valve is not limited to those described in the above embodiments. Such control may be performed in any manner as long as it is possible to cause the actual mixture ratio to approach the target mixture ratio.

The invention claimed is:

1. An exhaust gas control system for an internal combustion engine, comprising:
    a turbocharger that includes a compressor provided in an intake passage of an internal combustion engine and a turbine provided in an exhaust passage of the internal combustion engine;
    a high-pressure EGR device that has a high-pressure EGR passage which connects a portion of the exhaust passage, which is upstream of the turbine to a portion of the intake passage, which is downstream of the compressor, and that returns part of exhaust gas to the internal combustion engine through the high-pressure EGR passage;
    a low-pressure EGR device that has a low-pressure EGR passage which connects a portion of the exhaust passage, which is downstream of the turbine to a portion of the intake passage, which is upstream of the compressor, and that returns part of the exhaust gas to the internal combustion engine through the low-pressure EGR passage; and
    a control portion that controls a mixture ratio between the exhaust gas recirculated by the high-pressure EGR device and the exhaust gas recirculated by the low-pressure EGR device based on a correlation between the mixture ratio and a fuel consumption rate of the internal combustion engine while switching use of the high-pressure EGR device and use of the low-pressure EGR device or using the high-pressure EGR device and the low-pressure EGR device in combination,
    wherein a proportion of an amount of exhaust gas recirculated by the low-pressure EGR device to a total amount of exhaust gas recirculated increases as a load placed on the internal combustion engine increases.

2. The exhaust gas control system according to claim 1, wherein the correlation between the mixture ratio and the fuel consumption rate depends on the load placed on the internal combustion engine.

3. The exhaust gas control system according to claim 2, wherein, among different correlations determined for different loads placed on the internal combustion engine, the correlation is the correlation which corresponds to the load placed on the internal combustion engine.

4. The exhaust gas control system according to claim 1, wherein the mixture ratio is controlled to a mixture ratio at which the fuel consumption rate is an optimum value in the correlation between the mixture ratio and the fuel consumption rate.

5. The exhaust gas control system according to claim 4, wherein the optimum value of the fuel consumption rate is substantially a minimum value in the correlation between the mixture ratio and the fuel consumption rate.

6. The exhaust gas control system according to claim 1, wherein an upper limit of a proportion of an amount of exhaust gas recirculated by the low-pressure EGR device to a total amount of exhaust gas recirculated is set.

7. The exhaust gas control system according to claim 1, wherein the mixture ratio is controlled based further on an operating state of the internal combustion engine.

8. The exhaust gas control system according to claim 1, wherein the correlation between the mixture ratio and the fuel consumption rate is defined based on multiple correlations between the mixture ratio and respective fuel consumption rate components that exert influences on the fuel consumption rate.

9. The exhaust gas control system according to claim 8, wherein the correlation between the mixture ratio and the fuel consumption rate is defined based further on an operating state of the internal combustion engine.

10. The exhaust gas control system according to claim 8, wherein the correlation between the mixture ratio and the fuel consumption rate is defined based on at least one of a correlation between the mixture ratio and a low-pressure EGR positive correlation fuel consumption rate component that is a fuel consumption rate component which exerts an influence on the fuel consumption rate so that the fuel consumption rate increases as an amount of exhaust gas recirculated by the low-pressure EGR device increases, and a correlation between the mixture ratio and a high-pressure EGR positive correlation fuel consumption rate component that is a fuel consumption rate component which exerts an influence on the fuel consumption rate so that the fuel consumption rate increases as an amount of exhaust gas recirculated by the high-pressure EGR gas system increases.

11. The exhaust gas control system according to claim 10, wherein the correlation between the mixture ratio and the fuel consumption rate is defined based further on an operating state of the internal combustion engine.

12. The exhaust gas control system according to claim 11, wherein the correlation between the mixture ratio and the low-pressure EGR positive correlation fuel consumption rate component is defined based on at least one of a correlation between the mixture ratio and a low-pressure EGR high-load positive correlation fuel consumption rate component that exerts an influence on the fuel consumption rate so that the fuel consumption rate increases as a load placed on the internal combustion engine increases, and a correlation between the mixture ratio and a low-pressure EGR low-load positive correlation fuel consumption rate component that exerts an influence on the fuel consumption rate so that the fuel consumption rate increases as the load placed on the internal combustion engine decreases.

13. The exhaust gas control system according to claim 11, wherein the correlation between the mixture ratio and the high-pressure EGR positive correlation fuel consumption rate component is defined based on at least one of a correlation between the mixture ratio and a high-pressure EGR high-load positive correlation fuel consumption rate component that exerts an influence on the fuel consumption rate so that the fuel consumption rate increases as a load placed on the internal combustion engine increases, and a correlation between the mixture ratio and a high-pressure EGR low-load positive correlation fuel consumption rate component that exerts an influence on the fuel consumption rate so that the fuel consumption rate increases as the load placed on the internal combustion engine decreases.

14. The exhaust gas control system according to claim 10, further comprising:
    a throttle valve that is provided to at least one of a portion of the exhaust passage, which is downstream of a position at which the exhaust passage and the low-pressure EGR passage are connected to each other, and a portion of the intake passage, which is upstream of a position at which the intake passage and the low-pressure EGR passage are connected to each other,
    wherein the low-pressure EGR positive correlation fuel consumption rate component is correlated with a pressure difference between an upstream side and a downstream side of the throttle valve and exerts the influence on the fuel consumption rate, and the high-pressure EGR positive correlation fuel consumption rate component is correlated with a temperature of gas flowing in a combustion chamber of the internal combustion engine and exerts the influence on the fuel consumption rate.

15. The exhaust gas control system according to claim 10, further comprising:
a throttle valve that is provided to at least one of a portion of the exhaust passage, which is downstream of a position at which the exhaust passage and the low-pressure EGR passage are connected to each other, and a portion of the intake passage, which is upstream of a position at which the intake passage and the low-pressure EGR passage are connected to each other,
wherein the turbocharger is a variable capacity turbocharger that has a variable nozzle turbine, the low-pressure EGR positive correlation fuel consumption rate component is correlated with a pressure difference between an upstream side and a downstream side of the throttle valve and exerts the influence on the fuel consumption rate, and the high-pressure EGR positive correlation fuel consumption rate component is correlated with a pressure difference between an upstream side and a downstream side of the variable nozzle turbine, and exerts the influence on the fuel consumption rate.

16. An exhaust gas control method for an internal combustion engine provided with a turbocharger that has a compressor provided to an intake passage of an internal combustion engine and a turbine provided to an exhaust passage of the internal combustion engine; a high-pressure EGR device which has a high-pressure EGR passage that connects a portion of the exhaust passage, which is upstream of the turbine to a portion of the intake passage, which is downstream of the compressor, and which returns part of exhaust gas to the internal combustion engine through the high-pressure EGR passage; and a low-pressure EGR device which has a low-pressure EGR passage that connects a portion of the exhaust passage, which is downstream of the turbine to a portion of the intake passage, which is upstream of the compressor, and which returns part of the exhaust gas through the low-pressure EGR passage, characterized by comprising:
a mixture ratio between the exhaust gas recirculated by the high-pressure EGR device and the exhaust gas recirculated by the low-pressure EGR device is controlled based on a correlation between the mixture ratio and a fuel consumption rate of the internal combustion engine while use of the high-pressure EGR device and use of the low-pressure EGR device are switched or the high-pressure EGR device and the low-pressure EGR device are used in combination,
wherein a proportion of an amount of exhaust gas recirculated by the low-pressure EGR device to a total amount of exhaust gas recirculated increases as a load placed on the internal combustion engine increases.

17. The exhaust gas control method according to claim 16, further comprising:
obtaining an engine speed and an engine load of the internal combustion engine;
detecting an amount of intake air flowing through the intake passage using an airflow meter;
setting a target EGR rate;
setting a target mixture ratio;
calculating a target opening amount for a low-pressure EGR valve and a target opening amount for a high-pressure EGR valve based on the amount of intake air, the target EGR rate, and the target mixture ratio;
controlling an opening amount of the low-pressure EGR valve based on the target opening amount for the low-pressure EGR valve;
controlling an opening amount of the high-pressure EGR valve based on the target opening amount for the high-pressure EGR valve;
detecting a temperature of gas in an intake manifold of the internal combustion, engine;
determining whether the temperature of the gas is in a target temperature range, and correcting, if the temperature of the gas is not in the target temperature range, at least one of the opening amount of the low-pressure EGR valve and the opening amount of the high-pressure EGR valve.

18. The exhaust gas control method according to claim 17, wherein, if the temperature of the gas is lower than a lower limit of the target temperature range, the opening amount of the high-pressure EGR valve is increased.

19. The exhaust gas control method according to claim 17, wherein, if the temperature of the gas is higher than an upper limit of the target temperature range, the opening amount of the low-pressure EGR valve is increased.

20. The exhaust gas control method according to claim 16, wherein the method is repeated at predetermined time intervals.

* * * * *